US012275433B2

(12) United States Patent
Lau et al.

(10) Patent No.: US 12,275,433 B2
(45) Date of Patent: *Apr. 15, 2025

(54) LANDING PAD FOR AUTONOMOUS VEHICLES

(71) Applicant: TuSimple, Inc., San Diego, CA (US)

(72) Inventors: Jason Robert Lau, Vail, AZ (US); Leon Moore White, III, Fernandina Beach, FL (US)

(73) Assignee: TUSIMPLE, INC., San Diego, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/337,563

(22) Filed: Jun. 20, 2023

(65) Prior Publication Data

US 2023/0331255 A1 Oct. 19, 2023

Related U.S. Application Data

(63) Continuation of application No. 16/993,762, filed on Aug. 14, 2020, now Pat. No. 11,718,319.

(51) Int. Cl.
B60W 60/00 (2020.01)
G06V 20/13 (2022.01)
G06V 20/56 (2022.01)

(52) U.S. Cl.
CPC ......... B60W 60/0015 (2020.02); G06V 20/13 (2022.01); G06V 20/588 (2022.01); B60W 2420/403 (2013.01); B60W 2420/408 (2024.01)

(58) Field of Classification Search
None
See application file for complete search history.

(56) References Cited

U.S. PATENT DOCUMENTS

2007/0228214 A1    10/2007  Horak
2016/0125736 A1*   5/2016   Shaik ................. G08G 1/14
                                              701/410

(Continued)

FOREIGN PATENT DOCUMENTS

DE   102013213161 A1   1/2015
DE   102018008991 A1   5/2019

(Continued)

OTHER PUBLICATIONS

Lau, J. R. et al., "Launchpad for Autonomous Vehicles," U.S. Appl. No. 16/993,420, filed Aug. 14, 2020, 66 pages.

(Continued)

Primary Examiner — Tamara L Weber
(74) Attorney, Agent, or Firm — Perkins Coie LLP

(57) ABSTRACT

Each of a plurality of landing pads is sized and shaped to accommodate an AV. Landing pad sensor(s) are located in or around each landing pad. A control subsystem receives landing pad sensor data from the one or more landing pad sensors and receives, from a first AV traveling to a location of the plurality of landing pads, a request for an assigned landing pad in which the first AV should park. In response to this request, the control subsystem determines, based on the received landing pad sensor data, whether a first landing pad is free of obstructions that would prevent receipt of the first AV. If the first landing pad is free of obstructions, an indication is provided to the AV that the first landing pad is the assigned landing pad.

19 Claims, 11 Drawing Sheets

(56) References Cited

U.S. PATENT DOCUMENTS

| | | | |
|---|---|---|---|
| 2017/0267233 A1* | 9/2017 | Minster | B60W 30/06 |
| 2019/0137999 A1 | 5/2019 | Taguchi et al. | |
| 2019/0276010 A1* | 9/2019 | Mason | G05D 1/0212 |
| 2019/0340876 A1 | 11/2019 | Northrup et al. | |
| 2020/0148196 A1* | 5/2020 | Lim | G05D 1/0212 |
| 2022/0013012 A1* | 1/2022 | Higuchi | G08G 1/143 |

FOREIGN PATENT DOCUMENTS

| | | |
|---|---|---|
| DE | 102018002966 A1 | 8/2019 |
| DE | 102018209989 A1 | 12/2019 |
| JP | 2005138720 A | 6/2005 |
| JP | 2007284017 A | 11/2007 |

OTHER PUBLICATIONS

Lau, J. R. et al., "Mobile Launchpad for Autonomous Vehicles," U.S. Appl. No. 16/993,533, filed Aug. 14, 2020, 68 pages.
European Patent Office, Extended European Search Report, Application No. 21190898.3, dated Jan. 26, 2022, 9 pages.

* cited by examiner

LANDING PAD FOR AUTONOMOUS VEHICLES

CROSS-REFERENCE TO RELATED APPLICATION

The application is a continuation of U.S. patent application Ser. No. 16/993,762, filed Aug. 14, 2020, by Jason Robert Lara, and entitled "LANDING PAD FOR AUTONOMOUS VEHICLES," which is incorporated herein by reference.

TECHNICAL FIELD

The present disclosure relates generally to autonomous vehicle. More particularly, in certain embodiments, the present disclosure is related to a landing pad for autonomous vehicles.

BACKGROUND

One aim of autonomous vehicle technology is to provide vehicles that can safely navigate towards a destination with limited or no driver assistance. In some cases, an autonomous vehicle may allow a driver to operate the autonomous vehicle as a conventional vehicle by controlling the steering, throttle, clutch, gear shifter, and/or other vehicle control devices. In other cases, a driver may engage the autonomous vehicle navigation technology to allow the vehicle to drive autonomously. There exists a need to operate autonomous vehicles more safely and reliably.

SUMMARY

In an embodiment, a launchpad is sized and shaped to accommodate an autonomous vehicle (AV). The AV includes at least one vehicle sensor that is located on the AV and configured to observe a field-of-view that includes a region in front of the AV. The launchpad includes one or more launchpad sensors located on or around the launchpad. Each launchpad sensor is configured to observe at least a portion of the launchpad. A control subsystem receives launchpad sensor data from the one or more launchpad sensors and AV sensor data from the at least one vehicle sensor. A request is received for departure of the AV (i.e., for departure away from the launchpad). In response to the request for departure, the control subsystem determines, based at least in part upon the received launchpad sensor data, whether the launchpad is free of obstructions that would prevent departure from the launchpad. The control subsystem determines, based at least in part upon the received AV sensor data, whether the region in front of the AV is clear of obstructions that would prevent movement away from the launchpad. If it is determined that both the launchpad is free of obstructions that would prevent departure from the launchpad and the region in front of the AV is clear of obstructions that would prevent movement away from the launchpad, the AV is permitted to begin driving autonomously. Otherwise, if it is determined that one or both of the launchpad is not free of obstructions that would prevent departure from the launchpad and the region in front of the AV is not clear of obstructions that would prevent movement away from the launchpad, the AV is prevented from beginning to drive autonomously.

In another embodiment, each of a plurality of landing pads is sized and shaped to accommodate an AV. The AV includes at least one vehicle sensor located on the AV and configured to observe a field-of-view that includes a region in front of the AV. One or more landing pad sensors are located in or around each landing pad. Each landing pad sensor is configured to observe at least a portion of the landing pad. A control subsystem receives landing pad sensor data from the one or more landing pad sensors and receives, from a first AV traveling to a location of the plurality of landing pads, a request for an assigned landing pad in which the first AV should be positioned (e.g., in which the AV should come to a stop or park). In response to receiving the request for the assigned landing pad, the control subsystem determines, based on the received landing pad sensor data, whether a first landing pad is free of obstructions that would prevent receipt of the first AV. If it is determined that the first landing pad is free of obstructions that would prevent receipt of the first AV, an indication is provided to the AV that the first landing pad is the assigned landing pad. If it is determined that the first landing pad is not free of obstructions that would prevent receipt of the first AV, the control subsystem determines, based on the received landing pad sensor data, that a second landing pad is free of obstructions that would prevent receipt of the first AV. In response to determining that the second landing pad is free of obstructions that would prevent receipt of the first AV, an indication is provided to the AV that the second landing pad is the assigned landing pad.

In yet another embodiment, an AV includes at least one vehicle sensor that is located on the AV and configured, when the AV is stopped, to observe a first field-of-view that includes at least a first portion of a zone around the stopped AV. A portable device is configured to be operated by a user at a location where the AV is stopped. A control subsystem is communicatively coupled to the AV and the portable device. The control subsystem receives a request to allow restarting of movement of the AV following the AV being stopped. The control subsystem receives AV sensor data from the at least one vehicle sensor. The control subsystem receives a communication from the portable device. The communication from the portable device includes information regarding whether a second portion of the zone around the AV is free of obstructions. When combined, the first portion of the zone around the stopped AV and the second portion of the zone around the stopped AV encompass the entire zone around the stopped AV. The control subsystem determines, based on the AV sensor data, whether the first portion of the zone around the AV is free of obstructions that would prevent movement of the stopped AV and determines, based on the communication from the portable device, whether the second portion of the zone around the stopped AV is free of obstructions that would prevent movement of the stopped AV. If it is determined that both the first portion of the zone around the stopped AV and the second portion of the zone around the stopped AV are free of obstructions, the stopped AV is allowed to begin moving. Otherwise, if it is determined that at least one of the first portion of the zone around the stopped AV or the second portion of the zone around the stopped AV is not free of obstructions, the stopped AV is prevented from beginning to move.

This disclosure recognizes various problems and previously unmet needs related to AV navigation and driving. For example, previous autonomous vehicle navigation technology lacks tools for safely and reliably launching of an AV to begin moving along a route. For instance, previous technology may require a driver to steer the AV along an initial portion of a route (e.g., until the AV is on an appropriate road for autonomous driving). As another example, previous autonomous vehicle technology lacks resources for safely and reliably landing an AV at an appropriate location when the AV reaches its destination. Using previous technology, a driver typically takes control of the AV to steer the vehicle to an appropriate stopping point. Previous technology also fails to provide for the restarting of the movement of an AV when the AV comes to a stop along a route, such as when an AV must stop for maintenance or the like Certain embodiments of this disclosure solve problems of previous technology, including those described above, by facilitating the efficient, safe, and reliable launching, landing, and/or re-launching of autonomous vehicles with little or no intervention by a driver. For example, the disclosed systems provide several technical advantages by providing: 1) a launchpad which facilitates the safe, efficient, and reliable starting or "launching" of an AV to begin moving along a route; 2) a landing pad which facilitates the safe and reliable direction of an AV to an appropriate stopping location that is free of obstructions; and 3) a mobile AV re-launching system which facilitates the safe and reliable re-launching of a stopped AV such that it may continue moving along a route following a stop for maintenance or the like. As such, this disclosure may improve the function of computer systems used for AV navigation during at least a portion of a journey taken by an AV.

In some embodiments, the systems described in this disclosure may be integrated into a practical application of a launchpad which facilitates the efficient, safe, and reliable launching of an AV to begin moving along a route. A control subsystem, which is in communication with sensors positioned in and/or around the launchpad, uses information from these sensors in combination with information from the AV (e.g., data from sensors of the AV or in indication of whether the AV detects objects in its path) to determine whether the space around the AV is sufficiently clear to begin movement. Thus, the launchpad facilitates the automatic launching of an AV to begin moving along a route without requiring action by a driver. The launchpad may reduce or eliminate practical and technical barriers or bottlenecks to safely launching large numbers of autonomous vehicles from busy locations, such as those commonly encountered, for example, for the movement of freight and/or people. Examples of the launchpad and its operation are described in greater detail with respect to FIGS. 3 and 4 below.

In other embodiments, the systems described in this disclosure may be integrated into a practical application of a landing pad which facilitates the efficient, safe, and reliable routing and landing (i.e., parking or stopping) of an AV at an appropriate location that is free of obstructions. A control subsystem receives information from sensors positioned in and/or around landing pads and uses this sensor information to identify an appropriate landing pad that can safely receive an incoming vehicle. If the AV finds that a path or lane leading to the identified landing pad is obstructed, the control subsystem may identify a different landing pad that is free of obstructions and ready to receive the AV. The landing pad may reduce or eliminate practical and technical barriers or bottlenecks to safely receiving large numbers of AVs at a given location, such as a location to which a large volume of freight is transported, with little or no human intervention. Examples of the landing pad and its operation are described in greater detail with respect to FIGS. 5 and 6 below.

In yet other embodiments, the systems described in this disclosure may be integrated into a practical application of a mobile AV re-launching system which facilitates the efficient, safe, and reliable re-starting or re-launching of an AV which has stopped along a route (e.g., for maintenance or the like). A control subsystem receives information from a portable device operated by a user at the location of the stopped vehicle and information from the stopped AV and uses this combination of information to determine whether the zone or space around the AV is free of obstructions. If the zone around the stopped AV is free of obstructions, then it is safe for the AV to begin moving again. In some cases, the information from the portable device may be a confirmation (e.g., provided after a user visually inspects the zone around the AV) that the zone around the back and sides of the AV are free of obstructions. In some cases, the information from the portable device may include images and/or video of the zone around the AV, and the control subsystem may determine whether obstructions are detected in the images and/or video of the zone. Examples of the mobile AV re-launching system and its operation are described in greater detail with respect to FIGS. 7 and 8 below.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
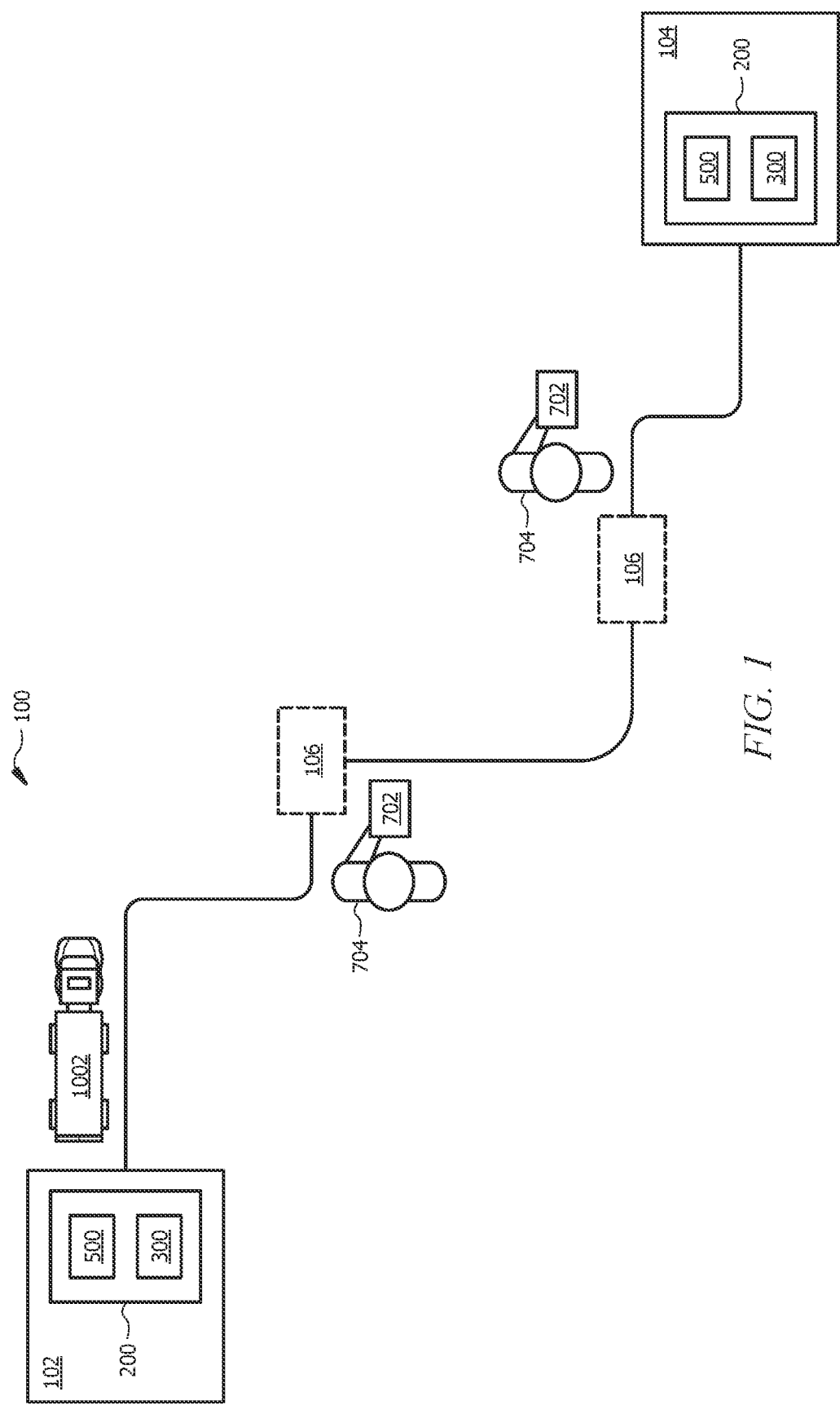
FIG. 1 is a schematic diagram of a route traveled by an AV.
Figure 2:
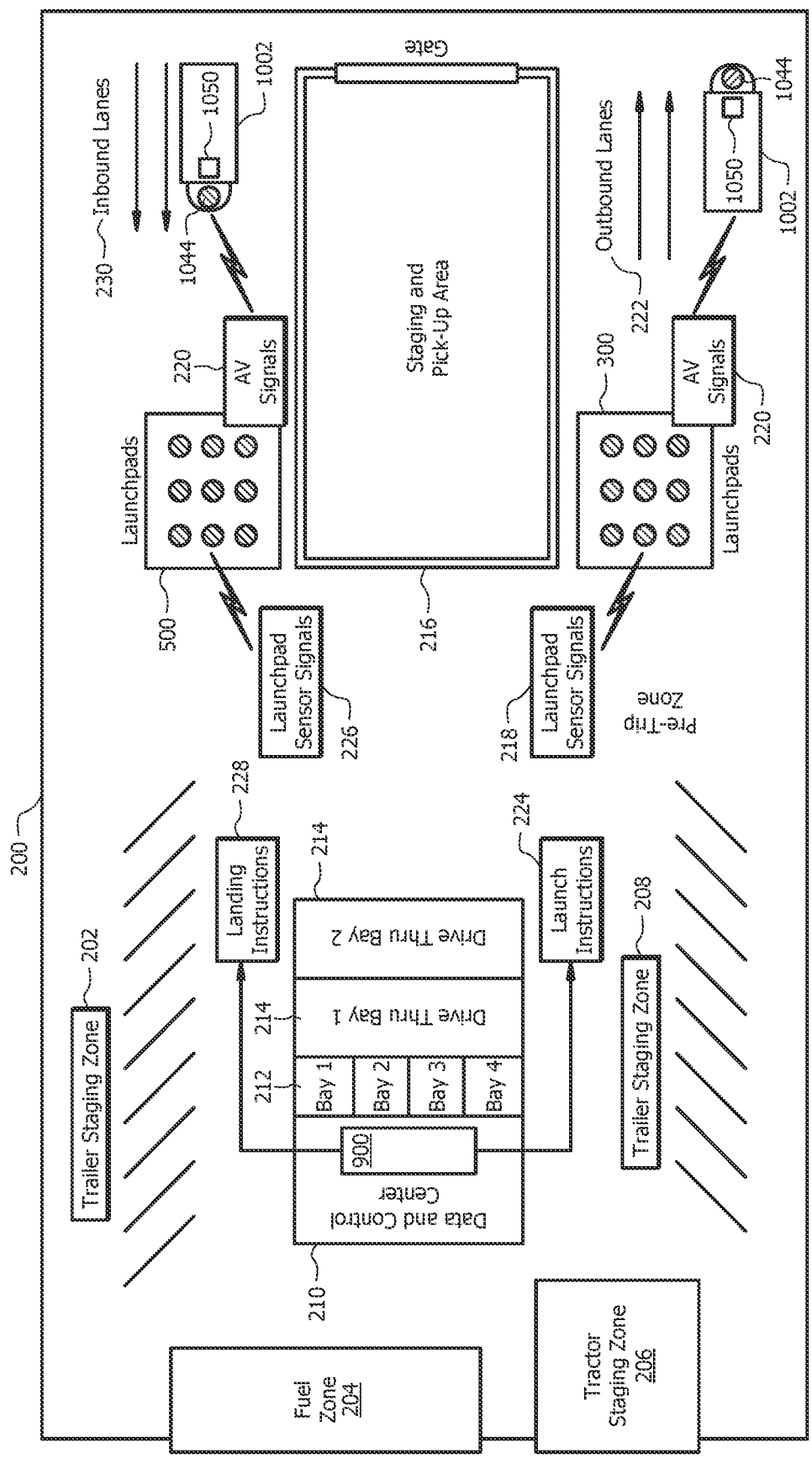
FIG. 2 is a schematic diagram illustrating an example of a vehicle terminal at the starting point and/or destination of the route illustrated in FIG. 1.
Figure 3:
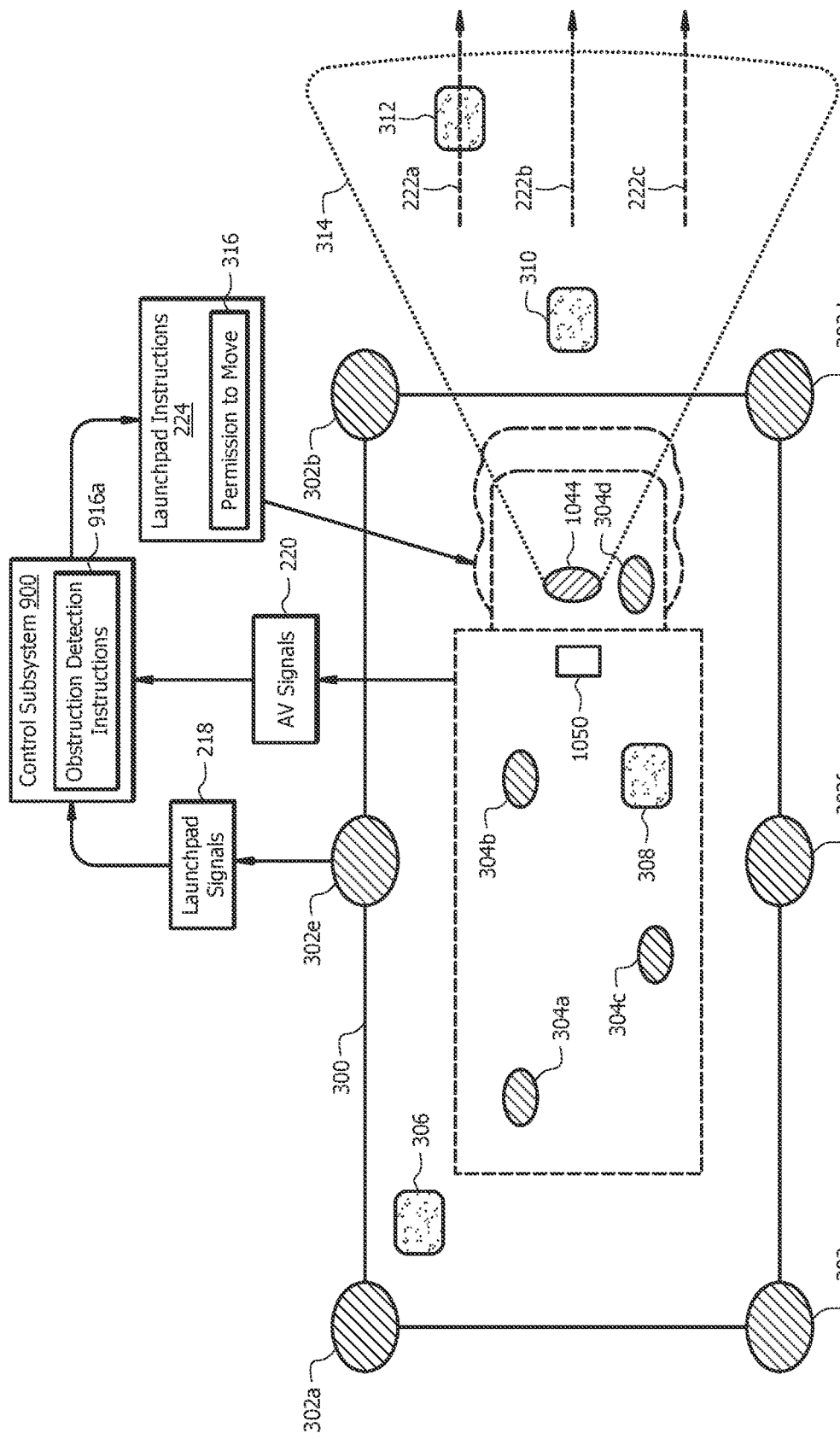
FIG. 3 is a schematic diagram of a launchpad according to certain embodiments of this disclosure.
Figure 4:
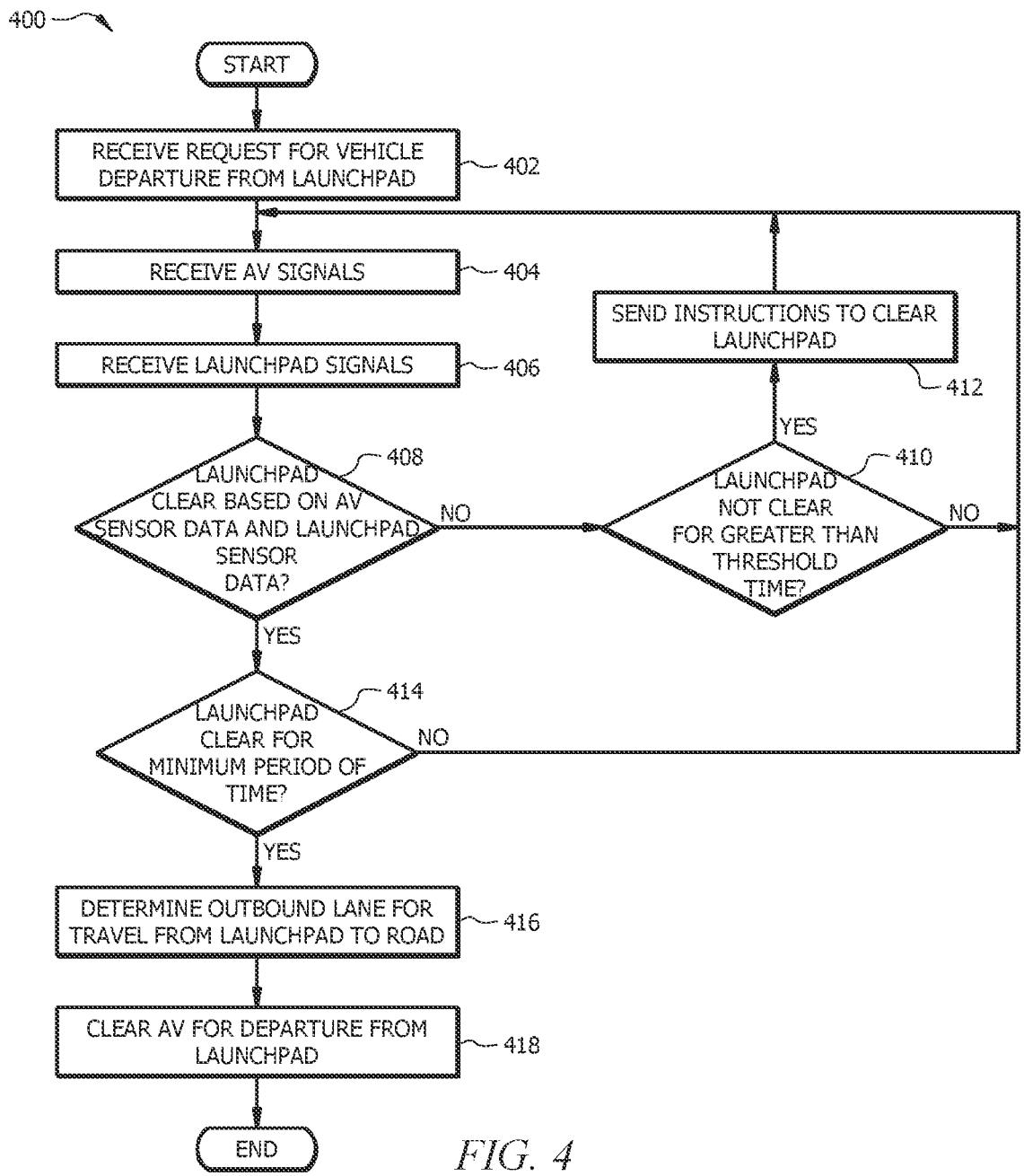
FIG. 4 is a flowchart of an example method of operating the launchpad illustrated in FIG. 3.
Figure 5:
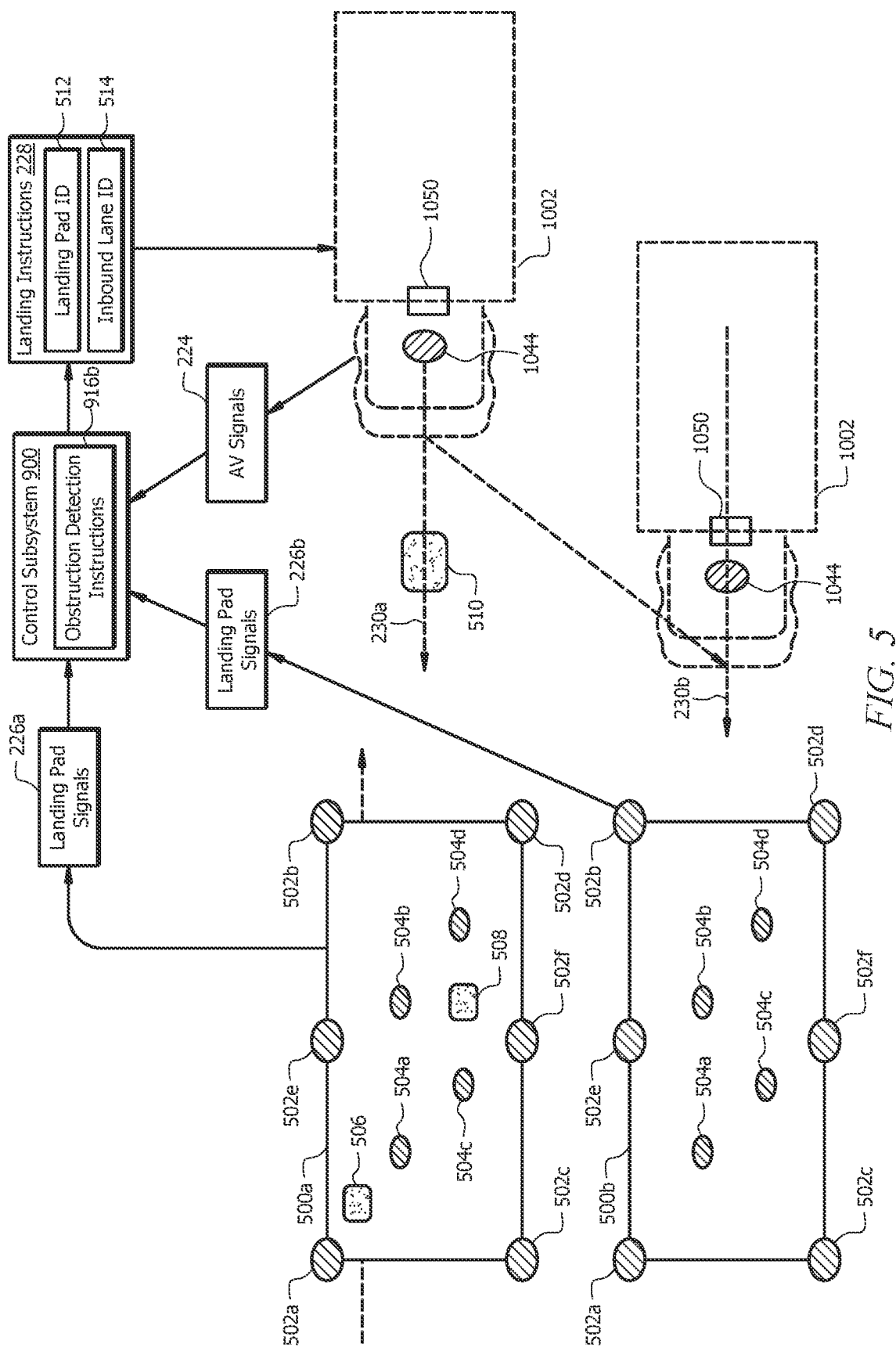
FIG. 5 is a schematic diagram of landing pads according to certain embodiments of this disclosure.
Figure 6:
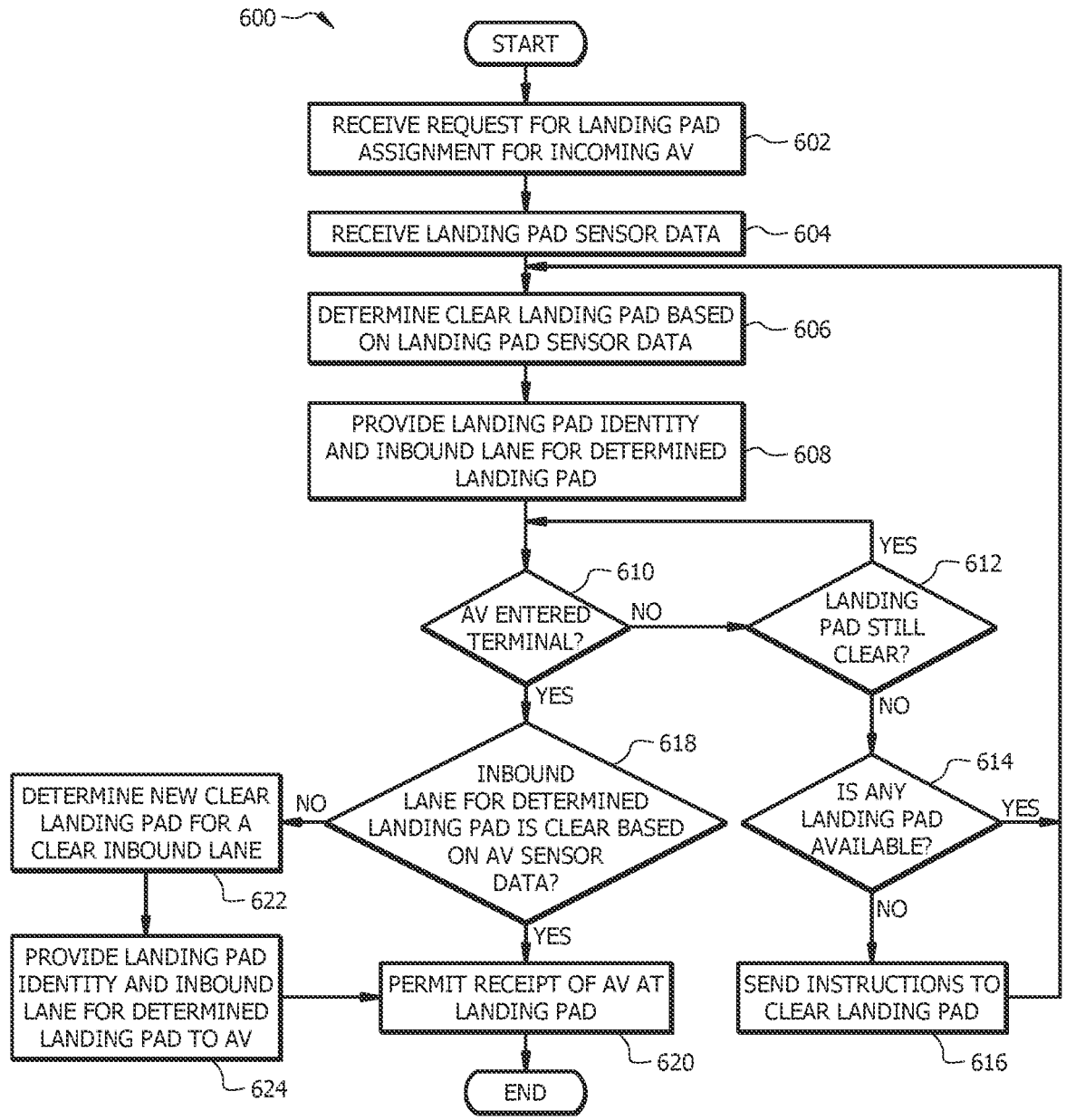
FIG. 6 is a flowchart of an example method of operating the landing pads illustrated in FIG. 5.
Figure 7A:
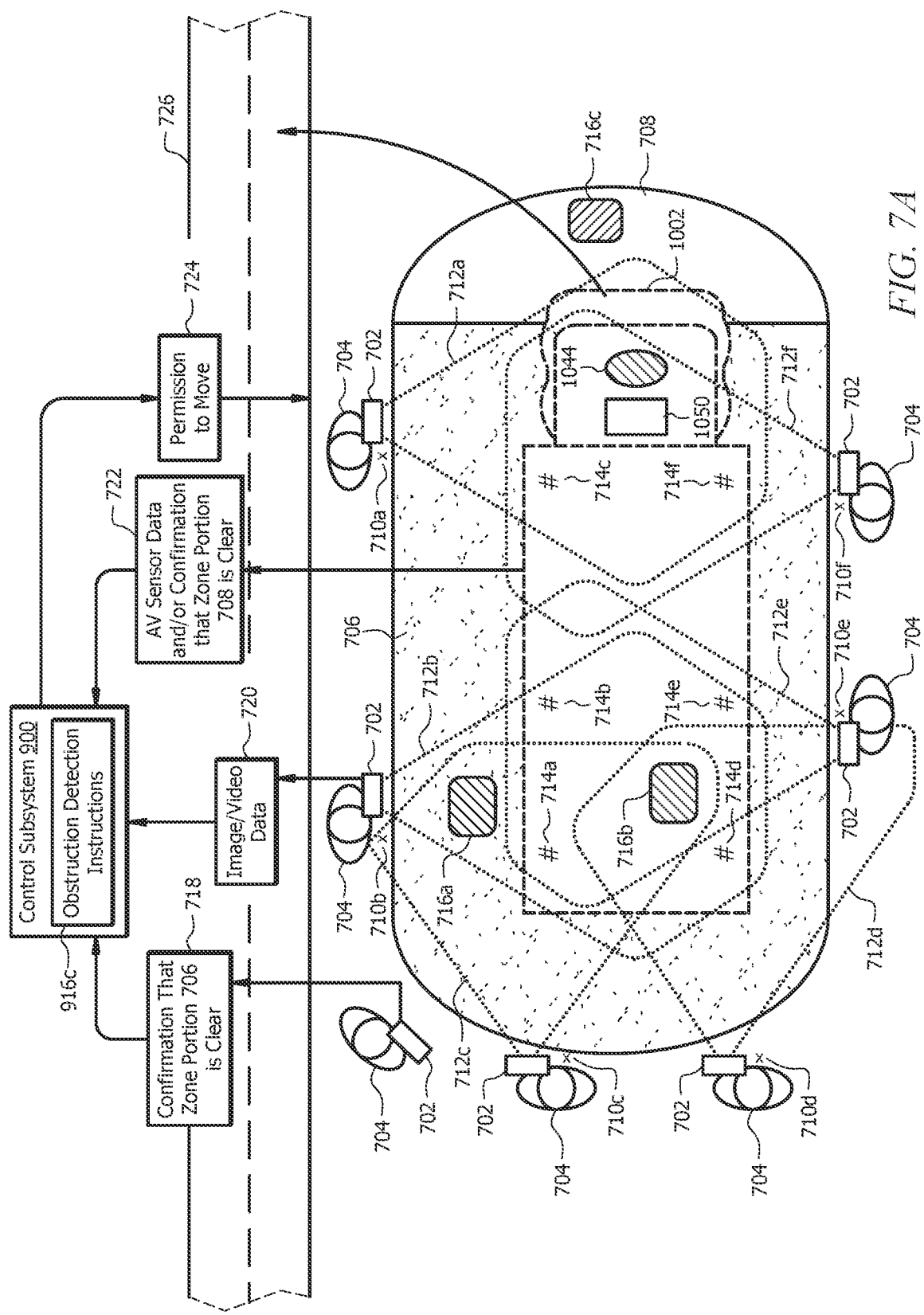
FIG. 7A is a schematic diagram of a mobile re-launching system according to certain embodiments of this disclosure.
Figure 7B:
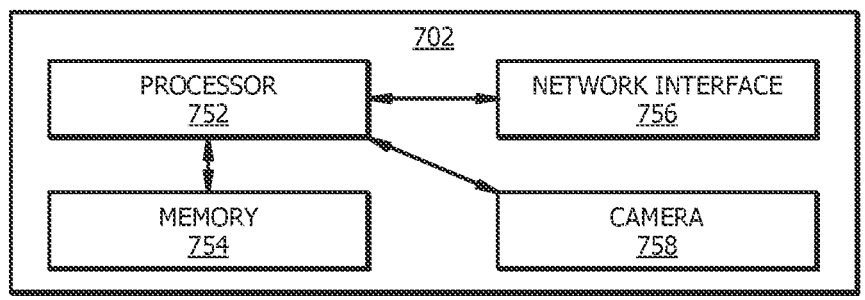
FIG. 7B is a block diagram of the portable device of FIG. 7A.
Figure 8:
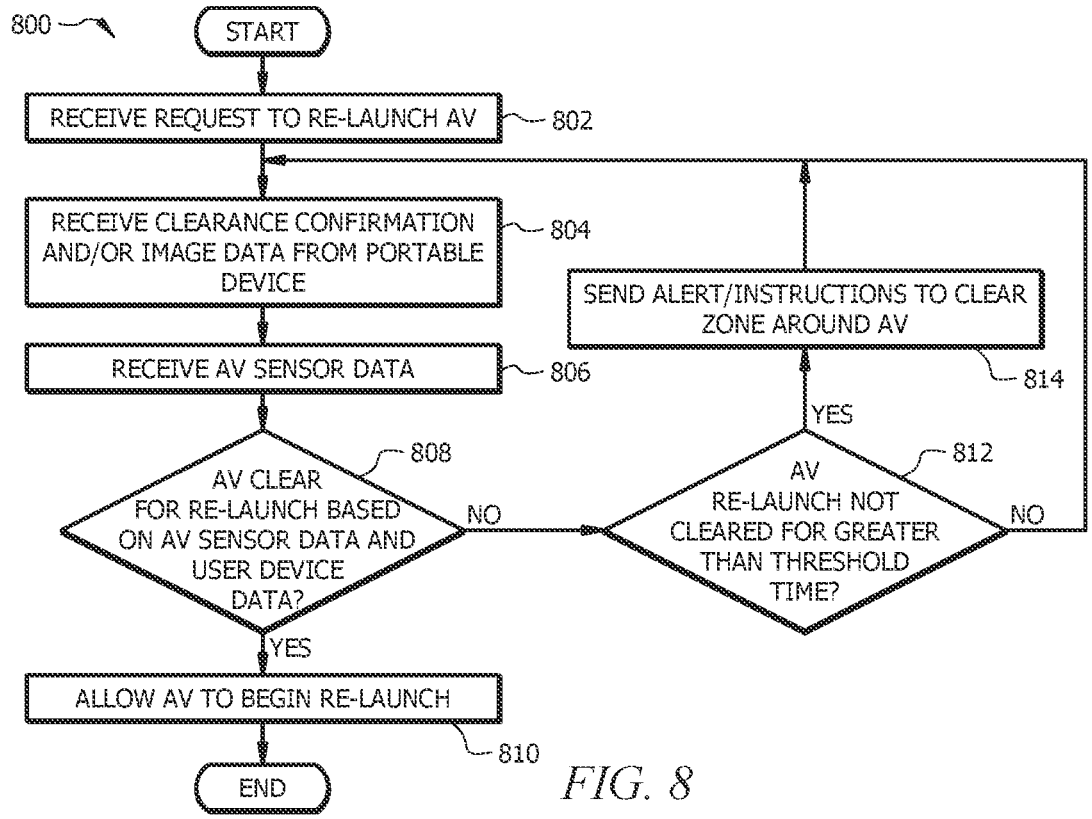
FIG. 8 is a flowchart of an example method of operating the mobile re-launching system illustrated in FIG. 7A.
Figure 9:
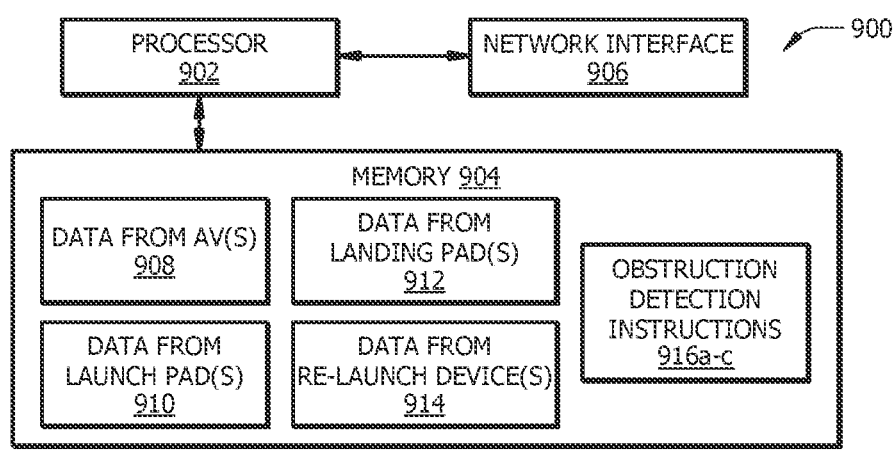
FIG. 9 is a block diagram of an example device configured to implement the control subsystem of FIGS. 2, 3, 5, and 7A.
Figure 10:
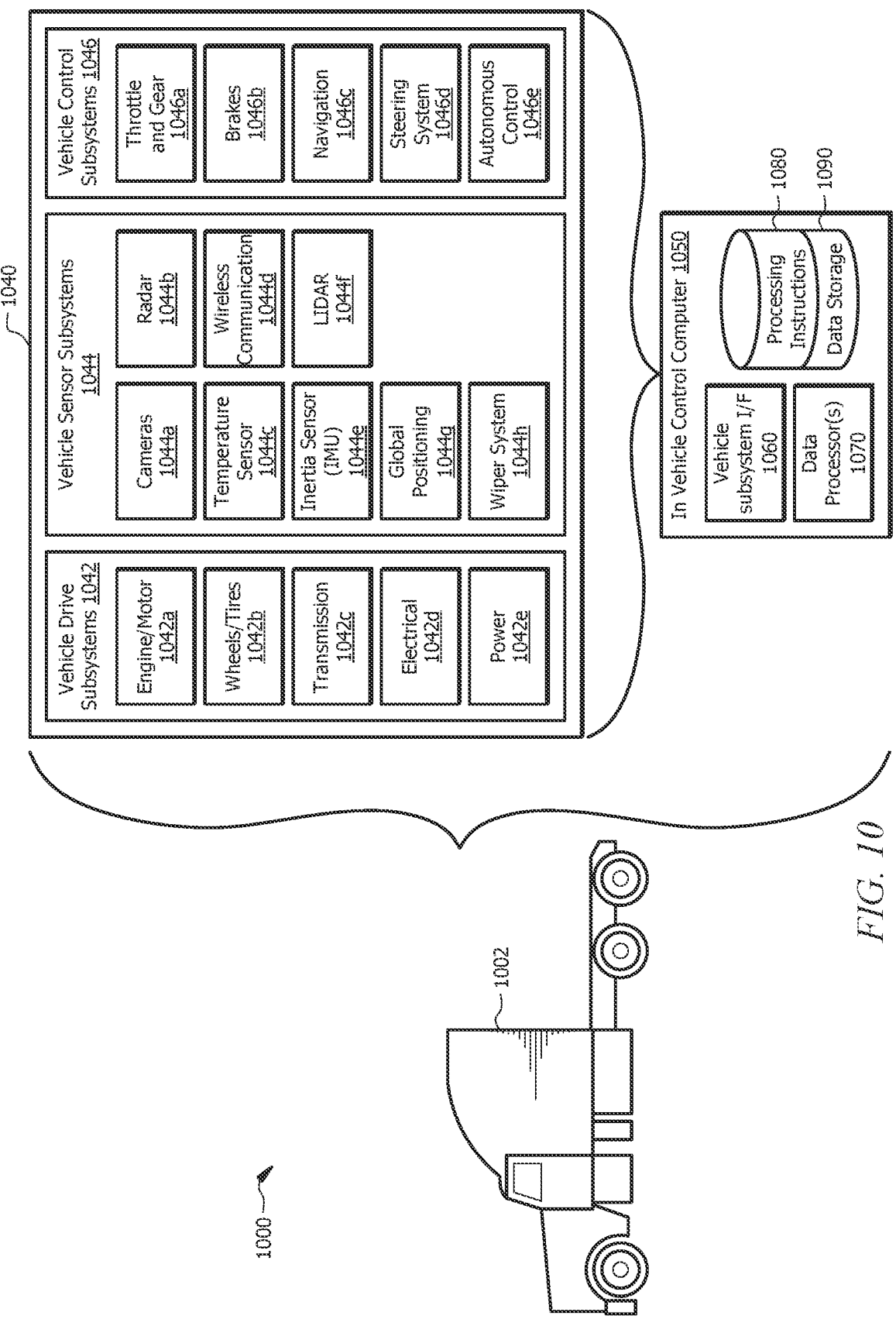
FIG. 10 is a diagram of an example autonomous vehicle configured to implement autonomous driving operations.
Figure 11:
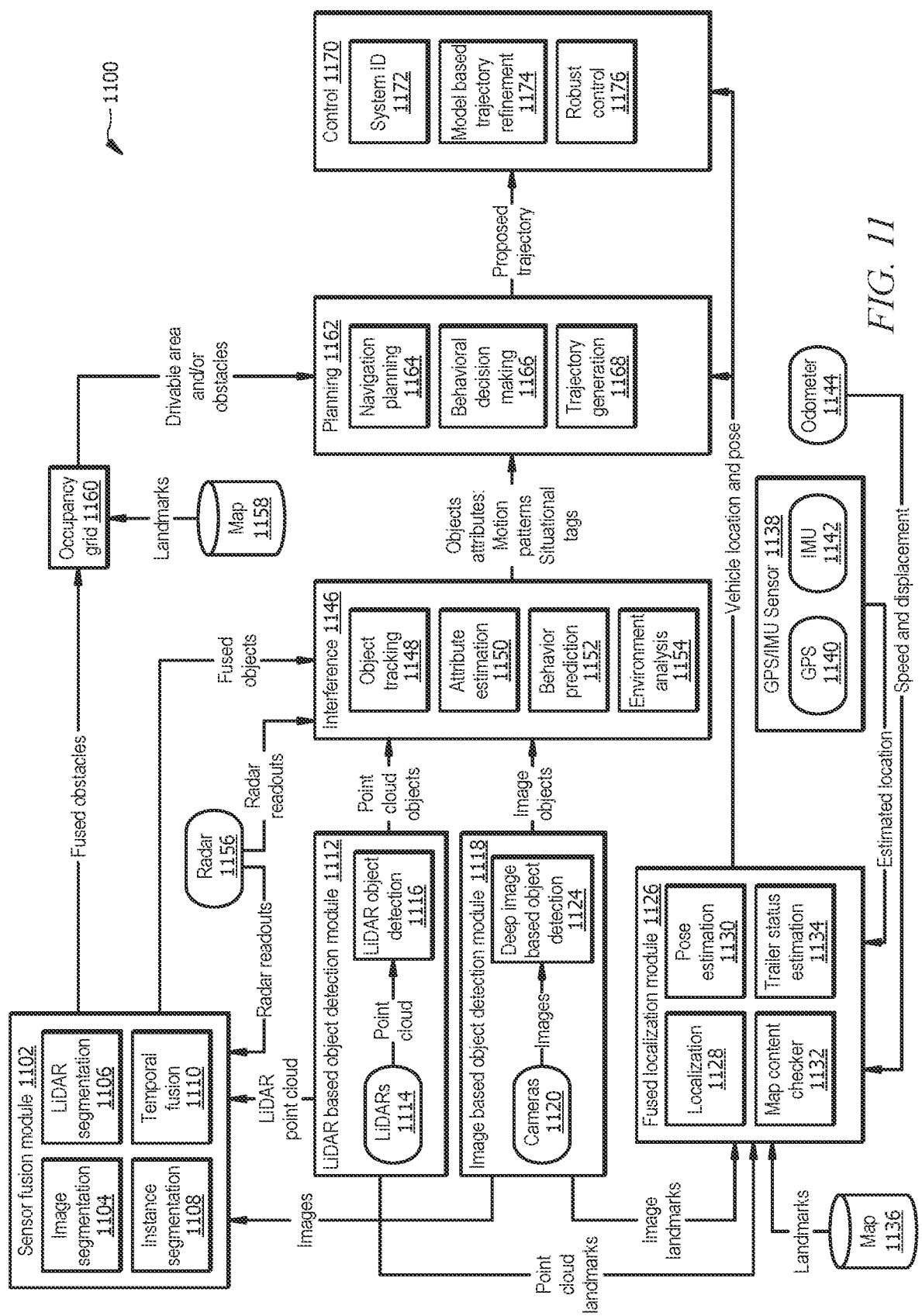
FIG. 11 is an example system for providing autonomous driving operations used by the AV of FIG. 10.
Figure 12:
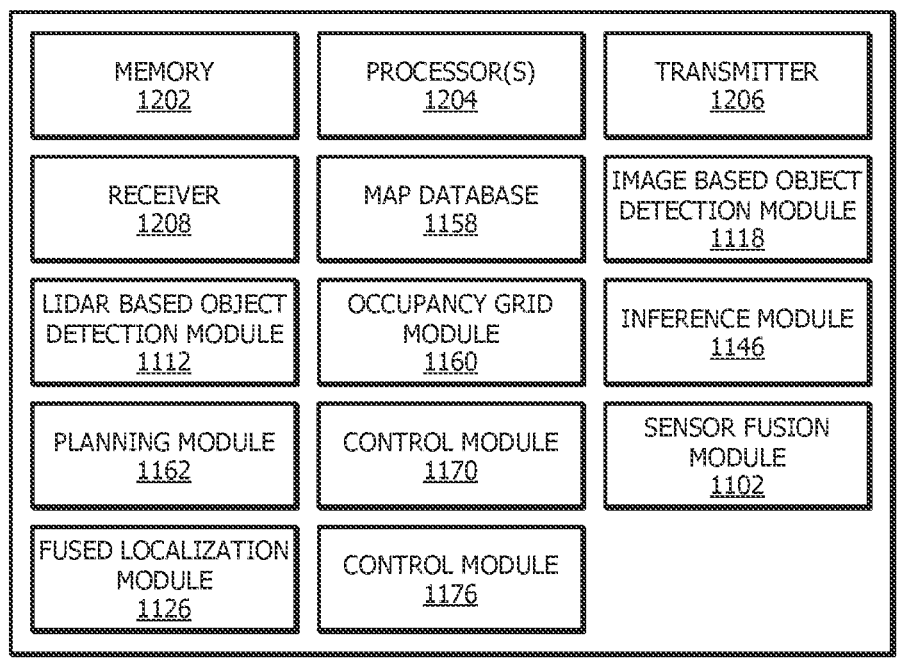
FIG. 12 is diagram of an in-vehicle control computer included in an autonomous vehicle.

As described above, previous technology fails to provide efficient and reliable resources for AV navigation particularly when an AV begins moving and/or is arriving at a destination. This disclosure provides various systems and devices for improving the navigation of AVs. FIG. 1 illustrates a path traveled from a starting point to a destination by an example autonomous vehicle. FIG. 2 illustrates an example of a terminal at the starting point and/or destination of the route illustrated in FIG. 1. The example terminal illustrated in FIG. 2 includes launchpads from which an AV may safely begin moving along the AV's route and landing pads at which the AVs may come safely to a stop. FIGS. 3 and 4 illustrate an example launchpad and its operation in greater detail. FIGS. 5 and 6 illustrate example landing pads and their operation in greater detail. As described further below, in some cases an AV may come to a stop along a route. The mobile AV re-launching system described in this disclosure facilitates the safe and user-friendly restarting of movement (i.e., re-launching) of a stopped AV in such situations. FIGS. 7A, 7B, and 8 illustrate an example mobile AV re-launching system, a portable device for use in such a system, and the operation of the re-launching system in greater detail. FIG. 9 illustrates an example control subsystem, which may be used to implement functions associated with the launchpads, landing pads, and mobile AV re-launching system. FIGS. 10-12 illustrate an example AV and various systems and devices for implementing autonomous driving operations by an AV.

Example AV Route and Terminal

FIG. 1 is a schematic diagram of an example route 100, which may be traveled by an autonomous AV 1002 between a first location 102 and a second location 104. The AV 1002 is described in greater detail below with respect to FIG. 10. In brief, the AV 1002 includes a sensor subsystem 1044 and an in-vehicle control computer 1050 which are operated to facilitate autonomous driving of the AV 1002. See FIGS. 10-12 for further description of the operation of the AV 1002. The first location 102 may be a starting location from which the AV 1002 begins moving, and the second location 104 may be a destination to which the AV 1002 is instructed to travel. For example, the AV 1002 may be a semi-truck tractor unit which attaches to a trailer to transport cargo or freight from the first location 102 to the second location 104 (see FIG. 10). In some cases, the AV 1002 may need to make one or more stops along the route 100. For example, the AV 1002 may stop at one or more intermediate locations 106. In such cases, a user 704 (e.g., a technician servicing the stopped AV 1002) may operate a portable device 702 to facilitate the safe re-launching of the AV 1002. Operation of the portable device 702 as part of a mobile AV re-launching system 700 is described in greater detail below with respect to FIGS. 7 and 8.

The first location 102 and/or the second location 104 may include a terminal 200 with launchpads 300 and/or landing pads 500. FIG. 2 illustrates an example of a terminal 200 in greater detail. The example terminal 200 of FIG. 2 facilitates preparing tractor-unit AVs 1002 for the transportation of cargo or freight along the route 100, automatically dispatching AVs 1002 from launchpads 300, and safely receiving incoming AVs 1002 at appropriate landing pads 500. The terminal 200 may facilitate the operation of both AVs 1002 (see FIG. 10) and conventional tractor units driven by human drivers.

Still referring to FIG. 2, the example terminal 200 includes a first trailer staging zone 202, a fueling zone 204, a tractor staging area 206, a second trailer staging zone 208, a control center 210, one or more vehicle bays 212, pass-through bays 214, a staging and pickup area 216, launchpads 300 and associated outbound lanes 222, and landing pads 500 and associated inbound lanes 230. The trailer staging zones 202, 208 are generally areas within the terminal 200 that are used to store trailers when not in use or attached to an AV 1002 that is a tractor unit. For example, the first trailer staging zone 202 may store trailers from incoming AVs 1002 arriving at the terminal 200, and the second trailer staging zone 208 may store outgoing trailers to be attached to tractor-unit AVs 1002 that will be launched from the launchpads 300. The fueling zone 204 is an area of the terminal 200 that includes resources such as fuel pumps for refueling the AVs 1002 and any other vehicle operating out of the terminal 200. The tractor staging zone 206 is generally an area of the terminal 200 that is used to prepare tractor-unit AVs 1002 prior to departure of the AVs 1002 to begin travel along the route 100 of FIG. 1. For example, maintenance and pre-trip diagnostics/testing may be performed on the AVs 1002 in the tractor staging zone 206.

The control center 210 is generally a space where administrators of the terminal 200 are located to oversee operations at the terminal 200. In some embodiments, the control center 210 houses a control subsystem 900 which communicates with AVs 1002 and sensors of the launchpads 300 and landing pads 500 to implement various functions of the launchpads 300 and landing pads 500 described in this disclosure (see FIGS. 3-6 and corresponding description below). While the example of FIG. 2 shows the control subsystem 900 being located within the control center 210, it should be understood that the control subsystem 900 may be located at any appropriate location and/or may be a distributed computing system. An example of the processor, memory, and interface of the control subsystem 900 is described in greater detail below with respect to FIG. 9.

The launchpads 300 generally facilitate the safe and efficient automatic departure of AVs 1002 from the terminal 200. For example, a launchpad 300 may be a physical pad (e.g., constructed of concrete or any appropriate material) that includes, is embedded with and/or is surrounded by sensors. The various sensors of a launchpad 300 are described in greater detail below with respect to FIG. 3. Sensor signals 218 from the launchpad sensors (see FIG. 3 and corresponding description below) and sensor signals 220 from an AV 1002 requesting to exit a launchpad 300 are provided to the control subsystem 900. The control subsystem 900 uses the sensor signals 218 from the sensors of the launchpad 300 and the sensor signals 220 from the AV 1002 to determine whether a zone or area around the AV 1002 is free of obstructions. If the zone around the AV 1002 is determined to be free of obstructions, then the control subsystem 900 allows the AV 1002 to begin moving out of the launchpad 300. In some cases, the control subsystem 900 may further determine an outbound lane 222 for the AV 1002 to take to exit the terminal 200 and reach a road used to travel along the route 100. An example of a launchpad 300 and its operation in conjunction with an example AV 1002 and control subsystem 900 are described in greater detail below with respect to FIGS. 3 and 4.

The landing pads 500 are generally predefined zones or regions with associated sensors which are used to determine whether the zone is free of obstructions which would prevent an AV 1002 from safely arriving at and parking in the zone. For example, a landing pad 500 may be a physical pad (e.g., constructed of concrete or any appropriate material) that includes, is embedded with and/or is surrounded by sensors. The various sensors which may be included in a landing pad 500 are described in greater detail below with respect to FIG. 5. While the example terminal 200 of FIG. 2 shows separate landing pads 500 and launchpads 300, in other embodiments the same structure (i.e., a predefined zone that includes appropriate sensors for detecting whether the zone is free of obstructions) may be used as both a landing pad 500 and a launchpad 300. Sensor signals 226 from the landing pad sensors (see FIG. 5 and corresponding description below) are provided to the control subsystem 900. The control subsystem 900 uses the sensor signals 226 from the sensors of the landing pad 500 to identify a landing pad 500 that is free of obstructions and available to receive an incoming AV 1002. The identified landing pad 500 is communicated to the incoming AV 1002 such that the AV 1002 can safely and efficiently navigate to this landing pad 500 which is already known to be free of obstructions, thereby significantly reducing the complexity of inbound AV 1002 navigation. If the inbound AV 1002 detects an obstruction in the inbound lane 230 that leads to the identified landing pad 500, the AV 1002 may communicate this obstruction to the control subsystem 900 (e.g., as AV signal 220), and the control subsystem 900 may identify a new landing pad 500 that can be reached using a different inbound lane 230 and is free of obstructions or a different inbound lane 230 leading to the assigned landing pad 500. An example of landing pads 500 and their operation in conjunction with an example AV 1002 and control subsystem 900 are described in greater detail below with respect to FIGS. 5 and 6.

Example Launchpad 300 and its Operation

FIG. 3 illustrates an example launchpad 300 in greater detail. The launchpad 300 includes a predefined zone or space (e.g., within the terminal 200 shown in FIGS. 1 and 2) that is sized and shaped to accommodate an AV 1002 and a set of sensors 302*a-f* around the perimeter of or within the launchpad 300. Landing pad 300 may be sized and shaped to fit a tractor-unit AV 1002 and an attached trailer. As an example, the physical extent of the launchpad 300 may be defined at least in part by the sensors 302*a-f* located around or within the launchpad 300. In some embodiments, the launchpad 300 includes a physical pad (e.g., a concrete pad). In some embodiments, the launchpad 300 includes physical markers (e.g., painted lines) around one or more edges or the perimeter of the launchpad 300.

The sensors 302*a-f* of the launchpad 300 include any sensors capable of detecting objects, motion, and/or sound which may be associated with the presence of an obstruction 306, 308 within the zone of the launchpad 300. For example, the sensors 302 may include cameras, LiDAR sensors, motion sensors, infrared sensors, and the like. The launchpad 300 generally includes a sensor 302*a-d* at each corner of the launchpad 300 (i.e., in each corner of the example rectangular launchpad 300 illustrated in FIG. 3). In some embodiments, the launchpad 300 may include additional sensors 302*e* and/or 302*f* at intermediate positions (e.g., along the length of the launchpad 300) to provide a view for detecting obstructions 306, 308 in regions of the launchpad 300 that are more distant from sensors 302*a-d* (e.g., regions near the center of the launchpad 300 which may not be visible because of the presence of the AV 1002).

One or more of the sensors 302*a-f* may be positioned at various heights relative to the ground, for example, by attaching the sensors 302*a-f* to a support structure, such as a pole. Positioning sensors 302*a-f* above the ground may provide for improved detection of obstructions 306, 308 that are above the ground such as objects attached to the side of an AV 1002, animals on or around the AV 1002, and the like. In some embodiments, sensors 302*a-f* are positioned at multiple heights relative to the ground. For example, one or more of the sensors 302*a-f* illustrated in FIG. 3 may represent a ground-level sensor, a mid-level sensor, and/or a high-level sensor. For example, a ground-level sensor 302 may be positioned at or near the level of the ground such that the ground-level sensor may detect obstructions 306, 308 within its field-of-view that encompasses a region at or near the ground (e.g., from the level of the ground to a few feet above the ground). A mid-level sensor 302 may be positioned at an intermediate height relative to the ground (e.g., at a height near the center point between the ground and the top of the AV 1002), such that the mid-level sensor has a field-of-view that encompasses a region near the middle of the AV 1002 (e.g., from near the ground to near the top of the AV 1002). A high-level sensor 302 may be placed above the mid-level sensor, for example, to detect obstructions 306, 308 at increased heights relative to the ground and/or to provide a more top-down view of portions of the launchpad 300.

In some embodiments, the launchpad 300 includes one or more additional sensors 304*a-d* on or within the surface of the launchpad 300. For example, sensors 304*a-d* may be configured to provide a view underneath an AV 1002 located in the launchpad 300. Like sensors 302*a-f*, the sensors 304*a-d* may include any appropriate type of sensors for detecting an obstruction 306, 308. For example, the sensors 304*a-d* may include cameras, LiDAR sensors, motion sensors, infrared sensors, and the like. Sensors 304*a-d* may particularly facilitate the detection of an obstruction, such as obstruction 308, that is near the center of the launchpad 300 and/or is below the AV 1002 that is parked on the launchpad 300. In some cases, such an obstruction 308 may not be detected by other sensors 302*a-f*. While the example launchpad 300 of FIG. 3 shows six sensors 302*a-f* and four sensors 304*a-d*, it should be understood that a launchpad 300 may include any appropriate number, combination, and placement of sensors 302*a-f* and/or 304*a-d*.

The sensors 304*a-f*, 304*a-d* of the launchpad 300 are in signal communication with the control subsystem 900. As described further with respect to the example operation below and the method 400 of FIG. 4, the sensors 302*a-f*, 304*a-d* generally communicate launchpad signals 218 to the control subsystem 900. The control subsystem 900 generally receives these signals 218 and uses the signals 218 to determine whether an obstruction 306, 308 is detected within the zone of the launchpad 300. The presence of an obstruction 306, 308 generally indicates that it is not safe for the AV 1002 to begin moving. As an example, if a sensor 302*a-f*, 304*a-d* is a camera, the signal 218 may include a video and/or photo of a portion of the launchpad 300 viewed by the sensor 302*a-f*, 304*a-d* (i.e., the portion of the launchpad 300 within the field-of-view of the camera). The control subsystem 900 uses obstruction detection instructions 916*a* to determine if an obstruction is detected in the video. For example, the obstruction detection instructions 916*a* may include code for implementing an object detection routine for images corresponding to frames of the video. If an unexpected object is detected (e.g., an object that is not known to be a part of the AV 1002), the control subsystem 900 determines that an obstruction 306, 308 is detected in the launchpad. The obstruction detection instructions 916*a* may similarly include code for implementing approaches to detecting obstructions based on LiDAR data (e.g., based on the detection of an unexpected object in or around the launchpad 300), motion sensor data (e.g., based on the detection of unexpected motion in or around the launchpad 300), sound (e.g., the detection of an unexpected sound near the launchpad 300), infrared data (e.g., based on the detection of an unexpected object in an infrared image), and the like. The obstruction detection instructions 916a may be implemented using the various modules described below with respect to the detection of objects and obstacles by the AV 1002 (see FIG. 11 and corresponding description below).

The control subsystem 900 also receives signals 220 from the AV 1002. The control subsystem 900 generally uses these signals 220 to determine that a zone 314 in front of the AV 1002 (e.g., a zone or region 314 defined at least in part by a field-of-view of the sensors of the vehicle sensor subsystem 1044) is free of obstructions 310, 312. These AV signals 220 may be signals from the vehicle sensor subsystem 1044 of the AV 1002 and/or communication from the in-vehicle control computer 1050 of the AV 1002. For example, the signal 220 may be a feed of images, LiDAR data, or the like obtained by the vehicle sensor subsystem 1044 of the AV. In such cases, the control subsystem 900 may use the obstruction detection instructions 916a to determine whether an obstruction 310, 312 is detected in the zone 314 in front of the AV 1002. In other cases, the AV signal 220 may include an indication of whether or not the in-vehicle control computer 1050 has detected an obstruction 310, 312 in front of the AV 1002 (see FIG. 11 and corresponding description below). If the control subsystem 900 determines both that the launchpad 300 is free of obstructions 306, 308 based on the launchpad signals 218 and that the zone 314 in front of the AV 1002 is free of obstructions 310, 312 based on signals 220, the controls subsystem 900 communicates launchpad instructions 224 that include a permission 316 for the AV 1002 to begin moving out of the launchpad 300. The control subsystem 900 may further identify an outbound lane 222 that the AV 1002 is to follow to exit the terminal 200 and being traveling along its route 100. For example, an outbound lane 222 may be selected that leads to a preferred starting point for the AV's route 100 and/or based on other traffic in the terminal.

In an example operation of the launchpad 300, the control subsystem 900 may receive a request for the AV 1002 to depart from the launchpad 300. In response to the request for departure, the control subsystem 900 determines, based at least in part upon the received launchpad sensor signals 218 (i.e., data included in signals 218), whether the launchpad 300 is free of obstructions that would prevent departure from the launchpad 300. For example, if the sensors 302a-f and/or 304a-d include cameras, the launchpad signals 218 may include images and/or video. In such cases, the control subsystem 900 may employ obstruction detection instructions 916a which include rules for detecting objects in the images and/or video and determining whether the detected objects correspond to obstructions 306, 308. For example, one or more predetermined methods of object detection (e.g., employing a neural network or method of machine learning) may be used to detect objects and determine whether a detected object corresponds to an obstruction 306, 308. Signals from infrared sensors 304a-f and/or 304a-d may be similarly evaluated to detect portions of infrared images with heat signatures associated with the presence of animals and/or people within the zone of the launchpad 300.

As another example, if the sensors 302a-f, 304a-d include LiDAR sensors, the launchpad signals 118 may include distance measurements. In such cases, the control subsystem 900 may employ obstruction detection instructions 916a which include rules for detecting obstructions 306, 308 based on characteristics and/or changes in the distance measurements. For example, changes in distances measured by a LiDAR sensor may indicate the presence of an obstruction 306, 308. For example, each LiDAR sensor may be calibrated to provide an initial distance measurement for when the launchpad 300 is known to be free of obstructions 306, 308. If the distance reported by a given LiDAR sensor changes from this initial value, an obstruction 306, 308 may be detected.

As yet another example, if the sensors 302a-f and/or 304a-d include motion sensors, the launchpad signals 118 may include motion data for the launchpad 300. In such cases, the control subsystem 900 may employ obstruction detection instructions 916a which include rules for detecting obstructions 306, 308 based on detected movement. For example, movement or motion detected within the zone of a launchpad 300 may be caused by the presence of an animal or person within the zone of the launchpad 300. Thus, if motion is detected within the zone of the launchpad 300, then the control subsystem 900 may determine that an obstruction 306 or 308 is detected within the zone of the launchpad 300. In some cases, before an obstruction 306, 308 is detected based on motion, detected movement may need to persist for at least a threshold period of time (e.g., fifteen seconds or more) to reduce or eliminate the false positive detection of obstructions 306, 308 caused by wind and/or other transient events (e.g., an animal, person, or vehicle passing through and immediately leaving the zone of the launchpad 300).

As a further example, if the sensors 302a-f and/or 304a-d include microphones for recording sounds in or around the launchpad 300, the launchpad signals 118 may include such sound recordings. In such cases, the control subsystem 900 may employ obstruction detection instructions 916a which include rules for detecting obstructions 306, 308 based on characteristics of the recorded sounds. For example, a sound corresponding to a person speaking, a vehicle operating or undergoing maintenance, or an animal making a characteristic sound may be evidence that an obstruction 306, 308 may be within the zone of the launchpad 300.

While certain examples of the detection of obstructions 306, 308 are described above, it should be understood that any other appropriate method of obstruction detection may be used by the control subsystem 900. In some embodiments, the control subsystem may use two or more types of sensor data to determine whether an obstruction 306, 308 is detected (e.g., by combining camera images and LiDAR data as described with respect to the sensor fusion module 1102 of FIG. 11) For example, obstructions 306, 308 may be detected using the methods and/or modules described for the detection of objects and obstacles by the AV 1002 (see FIG. 11 and corresponding description below). In other words, the obstruction detection instructions 916a may include instructions, rules, and/or code for implementing any of the modules described below with respect to FIG. 11.

The control subsystem 900 also determines, based at least in part on the received AV signal 220, whether the region 314 in front of the AV 1002 is clear of obstructions 310, 312 that would prevent movement of the AV 1002 away from the launchpad 300. For example, the same or similar approaches to those described above for detecting obstructions 306, 308 may be employed to detect obstructions 310, 312 in the region 314 in front of the AV 1002.

In the case where it is determined that both the launchpad 300 is free of obstructions 306, 308 that would prevent departure of the AV 1002 from the launchpad 300 and that the region 314 in front of the AV 1002 is clear of obstructions 310, 312 that would prevent movement of the AV 1002 away from the launchpad 300, the control subsystem 900 sends instructions 224 which include permission 316 for the AV 1002 to being driving autonomously. Alternatively, for the case where it is determined that one or both of the launchpad 300 is not free of obstructions 306, 308 that would prevent departure of the AV 1002 from the launchpad 300 and the region 314 in front of the AV 1002 is not clear of obstructions 310, 312 that would prevent movement of the AV 1002 away from the launchpad 300, the control subsystem 900 sends instructions 224 which include a denial 318 of permission to begin driving autonomously.

FIG. 4 illustrates an example method 400 of using the launchpad 300 of FIG. 3. The method 400 may be implemented by the launchpad 300 and control subsystem 900. The method 400 may begin at step 402 where the control subsystem 900 receives a request for departure of the AV 1002 from the launchpad 300. The request to depart from the launchpad 300 may occur automatically or in response to an input by a human. For example, a request to begin departure may be automatically provided anytime an AV 1002 is present in a launchpad 300. For example, upon determining that movement along route 100 should commence, the AV 1002 may submit a request to exit the launchpad 300. As another example, an individual (e.g., an operator of the AV 1002 and/or an administrator of the terminal 200) may provide a request to begin movement of the AV 1002.

At step 404, the control subsystem receives AV signals 220 from the AV 1002. As described above, AV signals 220 may include an indication of whether or not the in-vehicle control computer 1050 has detected an obstruction 310, 312 in front of the AV 1002 and/or sensor data from one or more sensors of the vehicle sensor subsystem 1044. At step 406, the control subsystem 900 receives launchpad signals 218. As described above, the launchpad signals 218 generally include data from the launchpad sensors 302*a-f*, 304*a-d*. The launchpad signals 218 may include one or more streams of image data, video data, distance measurement data (e.g., from LiDAR sensors), motion data, infrared data, and the like.

At step 408, the control subsystem 900 determines if the launchpad 300 and the zone 314 in front of the AV 1002 are both free of obstructions 306, 308, 310, 312, based on the received AV signals 220 and launchpad signals 218. For example, the control subsystem 900 may determine, based on the launchpad signals 218, if an obstruction 306, 308 is detected within the zone of the launchpad 300 or following completion of AV 1002 preparation or pre-trip procedure. For example, the control subsystem 900 uses the obstruction detection instructions 916*a* to determine if an obstruction 306, 308 is detected based on an image, a video, motion data, LiDAR data, an infrared image, and/or a sound recording included in the launchpad signals 218. Examples of the detection of obstructions 306, 308 in the zone of the launchpad 300 are described above with respect to FIG. 3. The obstruction detection instructions 916*a* generally include code for implementing approaches to detecting obstructions 306, 308 based on image data, video data, LiDAR data, motion sensor data, sound, infrared data, and the like. The control subsystem 900 also determines, based on the AV signals 220, if an obstruction 310, 312 is detected within the zone 314 in front of the AV 1002. As described above, obstructions 310, 312 may be detected by the in-vehicle computer 1050 and/or by the control subsystem 900 (i.e., similarly to as described above for the detection of obstructions 306, 308).

If an obstruction 306, 308 is detected within the zone of the launchpad 300 and/or an obstruction 310, 312 is detected in front of the AV 1002, the control subsystem 900 determines that the AV 1002 is not free to begin moving from the launchpad 300 at step 408, and the control subsystem 900 proceeds to step 410. At step 410, the control subsystem 900 determines whether the launchpad 300 and the region 314 in front of the AV is not free of obstructions 306, 308, 3310, 312 for a threshold time period (e.g., of 15 minutes or any other appropriate period of time). If the threshold time has not been reached at step 410, the control subsystem 900 continues to receive the AV signals 220 and launchpad signals 218 to determine if the launchpad 1002 becomes clear for departure of the AV 1002 at step 408. Otherwise, if the threshold time is reached, the control subsystem 900 may proceed to step 412 where instructions are provided to inspect the launchpad 300 (i.e., to remove detected obstruction(s) 306, 308, 310, 312. For example, the control subsystem 900 may detect a particular obstruction 308 in a particular portion of the launchpad 300 for at least a threshold period of time. In response, the control subsystem 900 may provide instructions to an administrator of the terminal 200 to inspect the particular portion of the launchpad 300 (e.g., the area where the obstruction 308 is detected). If a response is received (e.g., from the administrator of the terminal 200) that indicates that the portion of the launchpad 300 has become free of the particular obstruction 308 or never contained the obstruction 308, the control subsystem 900 may determine that the launchpad 300 is clear for departure of the AV 1002. In some embodiments, the control subsystem 900 may flag any sensors, such as sensors 302*f* and/or 304*b-d* which may be associated with detecting the obstruction 308, in order to indicate that some review or maintenance of these sensors 302*f* and/or 304*b-d* is appropriate (e.g., if the detected obstruction 308 was found to have not been present in the launchpad 300).

If an obstruction 306, 308 is not detected within the zone of the launchpad 300 and an obstruction 310, 312 is not detected in front of the AV 1002, the control subsystem 900 determines that the AV 1002 is free to begin moving from the launchpad 300 at step 408, and the control subsystem 900 may proceed to step 414. At step 414, the control subsystem 900 determines whether no obstruction 306, 308, 310, 312 is detected for at least a predefined period of time (e.g., of at least one minute or more). If the launchpad 300 is determined to be free of obstructions 306, 308, 310, 312 for at least the predefined period of time, the control subsystem 900 proceeds to step 416. Otherwise, if the launchpad 300 is not determined to be free of obstructions 306, 308, 310, 312 for at least the predefined period of time, the control subsystem 900 continues to receive AV signals 220 and launchpad signals 218 to determine if the launchpad 1002 remains free of obstructions 306, 308, 310, 312 for at least the predefined period of time.

At step 416, the control subsystem 900 may determine an appropriate outbound lane 222*a-c* along which the AV 1002 should travel to begin movement along the route 100 (e.g., to travel from the terminal 200 to a road). A lane 222*a-c* may initially be determined to provide a preferred starting point along the route 100 and/or based on local traffic in the terminal 200. For example, a first lane 222*a* may be selected because lane 222*a* leads to a preferred road for starting movement along the route 100 and/or is experiencing less traffic within the terminal 200. However, if an obstruction 312 is detected in the first outbound lane 222*a*, as illustrated in FIG. 3, the control subsystem 900 may determine an alternative outbound lane 222*b* or 222*c* on which the AV 1002 should travel. For example, the control subsystem 900 may instruct the AV 1002 to travel alone outbound lane 222*c* rather than 222b because lane 222*c* leads to a preferred starting point for the route 100 or because lane 222*c* is known to have less traffic within the terminal 200. The AV 1002 may also or alternatively determine and initiate its own lane adjustments as needed to facilitate safe autonomous driving from the launchpad 300 to a road on which to begin moving along the route 100. At step 418, the control subsystem 900 provides instructions 224 with permission 316 to begin driving autonomously. Autonomous driving of the AV 1002 is described in greater detail below with respect to FIGS. 10-12.

Example Landing Pads 500 and their Operation

FIG. 5 illustrates example landing pads 500 of FIGS. 1 and 2 in greater detail. The example landing pads 500a,b illustrated in FIG. 5 include a predefined zone or space (e.g., within the terminal 200 shown in FIGS. 1 and 2) that is sized and shaped to accommodate an AV 1002 and a set of sensors 502a-f around the perimeter of or within the landing pad 500a,b. As an example, the physical extent of each landing pad 500a,b may be defined at least in part by the corresponding sensors 502a-f located around or within the landing pad 500a,b. In some embodiments, the landing pads 500a,b include a physical pad (e.g., a concrete pad). In some embodiments, the landing pads 500a,b includes physical markers (e.g., painted lines) around one or more edges or the perimeter of the landing pads 500a,b. The landing pads 500a,b generally facilitate the safe and efficient receipt of inbound AVs 1002. In addition to facilitating the identification of a landing pad 500a,b that is free of obstructions for the receipt of an inbound AV 1002, the landing pads 500a,b also facilitate the routing of inbound AVs to areas within the terminal 200 that is appropriate for a cargo type being carried by the AV 1002 or the carrier operating the AV 1002. The landing pads 500a,b may further facilitate improved record keeping of inbound shipments and the locations of these shipments within the terminal 200.

The sensors 302a-f of the landing pads 500a,b may be the same as or similar to the sensors 302a-f described above for the example launchpad 300 of FIG. 1. For example, the sensors 502a-f may include any sensors capable of detecting objects, motion, sound, and the like, which may be used for the determination of the presence of obstructions 506, 508 within the zones of the landing pads 500a,b. For example, the sensors 502a-f may include cameras, LiDAR sensors, motion sensors, infrared sensors, and the like. Moreover, each sensor 502a-f illustrated in FIG. 5 may correspond to one or more sensors positioned at various heights relative to the ground, for example, to provide views of different portions of the space above the ground within the zones of the landing pads 500a,b, as described above with respect to the sensors 302a-f of FIG. 3. In some embodiments, landing pads 500a,b may include one or more additional sensors 504a-d on or within the surface of the landing pads 500a,b. These optional sensors 504a-d may be the same as or similar to the sensors 304a-d described above with respect to FIG. 3. While the example of FIG. 5 shows six sensors 502a-f and four sensors 504a-d, it should be understood that a landing pad 500a,b may include any appropriate number, combination, and placement of sensors (i.e., more or less than the number of sensors 502a-f, 504a-d illustrated in FIG. 5).

The sensors 504a-f, 504a-d of the landing pads 500a,b are in signal communication with the control subsystem 900. As described further with respect to the example operation below and the method 600 of FIG. 6, the sensors 502a-f, 504a-d generally communicate signals 226a,b (i.e., signals 226a for the first landing pad 500a and signals 226b for the second landing pad 500b) to the control subsystem 900. When an AV 1002 is traveling to the terminal 200, the AV 1002 may communicate to the control subsystem 900 that a landing pad 500 will soon be needed to receive the AV 1002. For example, the AV 1002 may request a landing pad assignment when the AV 1002 gets within a threshold distance of the terminal 200 (e.g., within ten miles of the terminal 200). In response to such a request for an assigned landing pad 500, the control subsystem 900 determines, based on received landing pad signals 226a,b (i.e., sensor data included in the signals 226a,b), a landing pad 500a,b that is free of obstructions 506, 508 that would prevent receipt of the AV 1002. As an example, if a sensor 502a-f, 504a-d of the landing pad 500a,b is a camera, the signal 226a may include a video of a portion of the landing pad 500 viewed by the sensor 502a-f, 504a-d (i.e., the portion of the landing pad 500 within the field-of-view of the camera). The control subsystem 900 uses obstruction detection instructions 916b to determine if an obstruction is detected in the video, similarly to as described above with respect to the example launchpad 300 of FIG. 3. The obstruction detection instructions 916b may similarly include code for implementing approaches to detecting obstructions based on LiDAR data (e.g., based on the detection of an unexpected object in or around the landing pad 500), motion sensor data (e.g., based on the detection of unexpected motion in or around the landing pad 500), sound (e.g., the detection of an unexpected sound near the landing pad 500), infrared data (e.g., based on the detection of an unexpected object in an infrared image), and the like.

If it is determined, as in the example of FIG. 5, that the first landing pad 500a is not free of obstructions 506, 508 and the second landing pad 500b is free of obstructions, the control subsystem 900 provides landing instructions 228 to the AV 1002 that include an indication of the identity 512 of the second landing pad 500b. The instructions 228 may further include an identity 514 of an appropriate inbound lane 230 which the AV 1002 should travel along to reach the assigned landing pad 500b. If the AV 1002 detects an obstruction 510 when traveling to the assigned landing pad 500a,b, then the AV 1002 may move into a different inbound lane 230a,b. In the example illustrated in FIG. 5, the AV 1002 detects an obstruction 510 in inbound lane 230a and moves into inbound lane 230b. The AV 1002 may communicate with the control subsystem 900 to ensure that the alternative inbound lane 230b leads to the assigned landing pad 500b, and if the alternative inbound lane 230b does not lead to the assigned landing pad 500b, the control subsystem 900 may identify a different landing pad 500a,b for the AV 1002.

In an example operation of the landing pads 500 of FIG. 5, the control subsystem 900 receives a request for a landing pad assignment for an inbound AV 1002 which is scheduled to arrive at the terminal 200 soon (e.g., within the next fifteen minutes or so). Following receipt of this request, the control subsystem 900 receives landing pad sensor signals 226a,b. The control subsystem 900 uses the landing pad sensor signals 226a,b to identify a landing pad 500a,b that is free of obstructions 506, 508. For example, if the sensors 502a-f and/or 504a-d include cameras, the landing pad sensor signals 226a,b may include images or video. In such cases, the control subsystem 900 may employ obstruction detection instructions 916b which include rules for detecting objects in the image or video and determining whether the detected objects correspond to obstructions 506, 508. For example, one or more predetermined methods of object detection (e.g., employing a neural network or method of machine learning) may be used to detect objects and determine whether a detected object corresponds to an obstruction 506, 508. Signals from infrared sensors 504a-f and/or 504*a-d* may be similarly evaluated to detect portions of infrared images with heat signatures associated with the presence of animals and/or people within the zone of the landing pads 500*a,b*.

As another example, if the sensors 502*a-f*, 504*a-d* include LiDAR sensors, the landing pad sensor signals 226*a,b* may include distance measurements. In such cases, the control subsystem 900 may employ obstruction detection instructions 916*b* which include rules for detecting obstructions 506, 508 based on characteristics and/or changes in the distance measurements. For example, changes in distances measured by a LiDAR sensor may indicate the presence of an obstruction 506, 508. For example, each LiDAR sensor may be calibrated to provide an initial distance measurement for when the landing pad 500*a,b* is known to be free of obstructions 506, 508. If the distance reported by a given LiDAR sensor changes from this initial value, an obstruction 506, 508 may be detected.

As yet another example, if the sensors 502*a-f* and/or 504*a-d* include motion sensors, the landing pad signals 226*a,b* may include motion data for the landing pads 500*a,b*. In such cases, the control subsystem 900 may employ obstruction detection instructions 916*b* which include rules for detecting obstructions 506, 508 based on detected movement. For example, movement or motion detected within the zone of a landing pad 500*a,b* may be caused by the presence of an animal or person within the zone of the landing pad 500*a,b*. Thus, if motion is detected within the zone of a landing pad 500*a,b*, then the control subsystem 900 may determine that an obstruction 506, 508 is detected within the zone of the landing pad 500*a,b*. In some cases, before an obstruction 506, 508 is detected based on motion, detected movement may need to persist for at least a threshold period of time (e.g., fifteen seconds or more) to reduce or eliminate the false positive detection of obstructions 506, 508 caused by wind and/or other transient events (e.g., an animal, person, or vehicle passing through and immediately leaving the zone of a landing pad 500*a,b*).

As a further example, if the sensors 502*a-f* and/or 504*a-d* include microphones for recording sounds in or around the landing pads 500*a,b*, the landing pad signals 226*a,b* may include such sound recordings. In such cases, the control subsystem 900 may employ obstruction detection instructions 916*b* which include rules for detecting obstructions 506, 508 based on characteristics of the recorded sounds. For example, a sound corresponding to a person speaking, a vehicle operating or undergoing maintenance, or an animal making a characteristic sound may be evidence that an obstruction 506, 508 is within the zone of the landing pad 500*a,b*. While certain examples of the detection of obstructions 506, 508 are described above, it should be understood that any other appropriate method of obstruction detection may be used by the control subsystem 900. For example, obstructions 506, 508 may be detected using the methods and/or modules described for the detection of objects and obstacles by the AV 1002 (see FIG. 11 and corresponding description below).

If an appropriate landing pad 500*a,b* is not detected, the control subsystem 900 may instruct an individual at the terminal 200 to clear obstructions from an appropriate landing pad 500*a,b*, and this landing pad 500*a,b* may subsequently be assigned to the inbound AV 1002 (e.g., after the control subsystem 900 verifies that the landing pad 500*a,b* is now free of obstructions). In addition to assigning a landing pad 500*a,b* to which the AV 1002 should navigate and come to a stop, the control subsystem 900 may also provide an identifier 514 of an appropriate inbound lane 230*a,b* for traveling through the terminal 200 to safely reach the assigned landing pad 500*a,b*.

When the AV 1002 enters the terminal 200 and begins traveling along its assigned lane 230*a,b*, the AV 1002 may detect an obstruction 510 in its path. In response, the AV 1002 may request that a new inbound lane 230*a,b* be assigned to the AV 1002 in order to reach the assigned landing pad 500*a,b*. Alternatively, the AV 1002 may automatically move into a different inbound lane 230*a,b* (e.g., into the free inbound lane 230*b* as illustrated in the example of FIG. 5) and travel along this new lane 230*a,b*. The AV 1002 may communicate with the control subsystem 900 to verify that the new inbound lane 230*a,b* can be used to reach the assigned landing pad 500*a,b*. If the new inbound lane 230*a,b* does not reach the assigned landing pad 500*a,b*, the control subsystem 900 may determine a new landing pad 500*a,b* to assign to the AV 1002 (i.e., a landing pad 500*a,b* which may be reached from the new lane 230*a,b*) or assign a new lane to the AV 1002 (i.e., such that the AV 1002 may navigate to the new assigned lane 230*a,b* to reach the appropriate assigned landing pad 500*a,b*).

FIG. 6 illustrates an example method 600 of using the landing pads 500*a,b* of FIG. 5. The method 600 may be implemented by the landing pads 500*a,b*, AVs 1002, and control subsystem 900. The method 600 may begin at step 602 where the control subsystem 900 receives a request for assignment of a landing pad 500*a,b* that can receive an inbound AV 1002. The request may include an expected arrival time of the AV 1002 and other information about the AV 1002, such as the size of the AV 1002 (i.e., such that the assigned landing pad 500*a,b* is an appropriate size), a type of cargo transported by the AV 1002 (e.g., such that the AV 1002 is directed to a landing pad 500*a,b* that is appropriate for receiving such cargo).

At step 604, the control subsystem 900 receives landing pad signals 226*a,b*. As described above, the landing pad signals 226*a,b* generally include data from the landing pad sensors 502*a-f*, 504*a-d*. The landing pad signals 226*a,b* may include one or more streams of image data, video data, distance measurement data (e.g., from LiDAR sensors), motion data, infrared data, and the like.

At step 606, the control subsystem 900 determines a landing pad 500*a,b* that is free of obstructions 506, 508 that would prevent receipt of the incoming AV 1002. For example, the control subsystem 900 may determine, based on the landing pad signals 226*a,b*, if an obstruction 506, 508 is detected within the zones of the landing pads 500*a,b*. For example, the control subsystem 900 may use the obstruction detection instructions 916*b* to determine if an obstruction 506, 508 is detected based on an image, a video, motion data, LiDAR data, an infrared image, and/or a sound recording included in the landing pad signals 226*a,b*. Examples of the detection of obstructions 506, 508 in the zones of the landing pads 500*a,b* are described above with respect to FIG. 5. In some embodiments, the control subsystem 900 further determines an inbound lane 230*a,b* that the incoming AV 1002 should travel along to reach the landing pad 500*a,b* that is determined to be free of obstructions 506, 508. For example, the lane 230*a,b* may be selected based on its proximity to a road from which the AV 1002 is expected to enter the terminal 200, known traffic within the terminal 200, and/or the cargo type transported by the incoming AV 1002. In some embodiments, the control subsystem 900 may first determine that landing pad 500*a,b* is free of obstructions 506, 508 for at least a threshold time period (e.g., of 15 minutes or any other appropriate period of time) before proceeding to step 608.

At step 608, the control subsystem 900 provides landing instructions 228 to the incoming AV 1002. As described above, the landing instructions 228 may include an indication of the identity 512 of the landing pad 500a,b that was identified at step 606. The instructions 228 may further include an identity 514 of an appropriate inbound lane 230a,b which the AV 1002 should travel along to reach the assigned landing pad 500a,b.

At step 610, the control subsystem 900 determines whether the AV 1002 has entered the terminal 200. If the AV has not entered the terminal 200 yet, the control subsystem 900 may proceed to step 612 to check that the assigned landing pad 500a,b remains free of obstructions 506, 508. For example, the control subsystem may determine whether an obstruction 506, 508 is detected as described above with respect to step 606. If an obstruction is detected at step 612, the control subsystem 900 may proceed to step 614 to check whether there are any available landing pads 500a,b.

If no landing pad 500a,b is available at step 614, the control subsystem 900 may proceed to step 616 where the control subsystem 900 sends an instruction to clear a landing pad 500a,b to receive the inbound AV 1002. For example, the control subsystem 900 may detect a particular obstruction 506,508 in a particular portion of the landing pad 500a,b for at least a threshold period of time. In response, the control subsystem 900 may provide instructions to an administrator of the terminal 200 to inspect the particular portion of the landing pad 500a,b (e.g., the area where the obstruction 506, 508 is detected). If a response is received (e.g., from the administrator of the terminal 200) by the control subsystem 900 that indicates that the portion of the landing pad 500a,b has become free of the particular obstruction 506, 508, the control subsystem 900 may determine that the landing pad 500a,b is available for receipt of the incoming AV 1002. In some embodiments, the control subsystem 900 may flag any sensors, such as sensors 502a-f and/or 504a-d which may be associated with detecting the obstruction 505, 508, in order to indicate that some review or maintenance of these sensors 502a-f and/or 504a-d may be appropriate (e.g., if a detected obstruction 506, 508 was not actually present in the zone of the landing pad 500a,b such that the sensor 502a-f and/or 504a-d was likely malfunctioning). The control subsystem 900 generally then returns to step 606 described above to identify a landing pad 500a,b to assign to the incoming AV 1002.

If the control subsystem determines, at step 610, that the AV 1002 has entered the terminal 200, the control subsystem 900 may continue to monitor signals 220 received from the AV 1002 in case a different landing pad 500a,b and/or inbound lane 230a,b should for some reason be assigned to the AV 1002, as exemplified by example steps 618, 620, 622, 624. At step 618, the control subsystem 900 determines that the inbound lane 230a,b assigned to the AV 1002 is blocked by an obstruction 510. For example, the AV 1002 may detect the obstruction 510 using the vehicle sensor subsystem 1044 and in-vehicle computer 1050 and communicate the detected obstruction 510 to the control subsystem 900. If such a communication is received, the control subsystem 900 may determine a new landing pad 500a,b at step 622 (e.g., as escribed above with respect to step 606) and provide new landing instructions 228 to the AV 1002 at step 624 before permitting the AV 1002 to stop at the assigned landing pad 500a,b at step 620. For example, at step 618, the control subsystem 900 may receive an indication that the AV 1002 has detected obstruction 510 and moved from initial inbound lane 230a to alternate new inbound lane 230b. The control subsystem 900 may check that the alternate lane 230b leads to the assigned landing pad 500a,b. If the alternate lane 230b does not lead to the assigned landing pad 500a,b, the control subsystem 900 may determine a new landing pad 500a,b that can be accessed from the alternate lane 128b or determine a different inbound lane 130a,b that can be used to reach the assigned landing pad 500a,b.

Example Mobile Re-Launching System 700 and its Operation

FIG. 7A illustrates an example of a mobile AV re-launching system 700. The re-launching system 700 includes the portable device 702 (see also FIG. 1), the control subsystem 900, and an AV 1002. The re-launching system 700 generally facilitates the restarting of movement of the AV 1002 along its route 100 following a stop (e.g., at one of the intermediate locations 106 illustrated in FIG. 1). For example, if the AV 1002 stops for maintenance or any other reason, one or more users 704 at the location of the stopped AV 1002 may operate the portable device 704 to confirm that at least a first portion 706 of the zone or space around the AV 1002 is free of obstructions 716a,b that would prevent safe movement of the AV 1002. In one embodiment, a user 704 comprises a mechanic, repairman, service technician, monitor, emergency personnel, or other appropriate individual that facilitates re-launching AV 1002 after it has stopped, such as for example, along route 100. The vehicle sensor subsystem 1044 and/or in-vehicle control computer 1050 of the AV 1002 may provide information 722 which includes AV sensor data and/or another confirmation indicating whether at least a second portion 708 of the zone around the stopped AV 1002 is free of obstructions 716c. If control subsystem 900 determines that both portion 706 and portion 708 of the zone around the stopped AV 1002 are free of obstructions 716a-c, the control subsystem 900 may provide permission 724 for the stopped AV 1002 to begin moving again (e.g., by moving back into the road 726 to travel along the route 100 of FIG. 1).

The device 702 may be any mobile or portable device (e.g., a mobile phone, computer, or the like). The portable device 702 generally includes a user interface which is operable to receive user input. The user input may include a confirmation 718 that is provided by the user 704 after the user 704 verifies that the portion 706 of the zone around the AV 1002 is free of obstructions 716a,b. The portable device 702 may include a camera or other appropriate sensor for obtaining images and/or videos 720 which may be provided to the control subsystem 900. As described further below and with respect to FIG. 8, the control subsystem 900 (or the portable device itself) may determine whether an obstruction 716a,b is detected in the images and/or videos 718 (e.g., using the obstruction detection instructions 916b described above with respect to FIGS. 2-6). Example components of a portable device 702 are illustrated in FIG. 7B and described further below.

In some embodiments, the user 704 visually inspects the portion 706 of the zone around the AV 1002 to determine if an obstruction 716a,b is present. If no obstruction 716a,b is detected by the user 704, the user 704 may input confirmation 718 that the zone portion 706 is free of obstructions 716a,b, and the portable device 702 may send the confirmation 718 to the control subsystem 900. In embodiments in which the portable device 702 includes a camera, the user 704 may move the portable device 702 around the zone portion 706 to obtain images and/or video of the zone portion 706. For example, images and/or videos 720 may be obtained for various fields-of-view 712a-f such that the images and/or video 720 encompass at least the zone portion 706. For example, the user 704 may move around the vehicle and capture images and/or videos 720 at the positions 710a-f illustrated by an "X" in FIG. 7A, such that the camera of the portable device 702 (e.g., camera 758 of the example portable device 702 illustrated in FIG. 7B) captures images and/or video 720 for the different fields-of-view 712a-f. In a particular embodiment, the user 704 moves around the vehicle and captures images and/or videos 720 at the positions 710a-f within a predetermined time period determined to be short enough that a determination can be made whether the zone portion 706 is clear and safe to re-launch AV 1002.

In some embodiments, part of the AV 1002 (e.g., the trailer attached to the AV 1002) may include visible markers 714a-f which are positioned to facilitate the user-friendly capture of images and/or videos 720 that encompass at least the zone portion 706. The user 704 may position the portable device 702 such that images and/or videos 720 are taken that capture each of the markers 714a-f. The markers 714a-f may include a barcode which can be interpreted by the control subsystem 900 in received images and/or video 720. Thus, the markers 714a-f may ensure that the images and/or video 720 provided from the portable device 702 include views that are appropriate for ensuring that the portion 706 of the zone around the AV 1002 is free of obstructions 716a,b. The markers 714a-f may further be used to identify the AV 1002 that is being re-launched by the re-launching system 700, such that the control subsystem 900 may efficiently identify the stopped AV 1002 and maintain a record of its re-launch.

In embodiments involving the provision of images and/or videos 720 from the portable device 702, the control subsystem 900 receives the images and/or videos 720 and uses the obstruction detection instructions 916c to determine if an obstruction 716a,b is detected in the images and/or videos 720. Examples of the detection of obstructions such as obstructions 716a,b is described above with respect to FIGS. 3-6, and the same or similar approaches may be used to detect obstructions 716a,b. For example, the control subsystem 900 may use the obstruction detection instructions 916c which include rules for detecting objects in the images and/or videos 720 and determining whether the detected objects correspond to obstructions 716a,b. For example, one or more predetermined methods of object detection (e.g., employing a neural network or method of machine learning) may be used to detect objects and determine whether a detected object corresponds to an obstruction 716a,b.

The control subsystem 900 also receives information 722 from the AV 1002 which includes sensor data and/or an indication of whether an obstruction 716c is detected in the portion 708 of the zone around the AV 1002 (see FIG. 11 and corresponding description below regarding the detection of obstacles or obstructions by the AV 1002). The portion 708 of the zone around the AV 1002 generally includes a region in front of the AV 1002 (e.g., in the field-of-view of one or more sensors of the vehicle sensor subsystem 1044 of the AV 1002). In some cases, the in-vehicle control computer 1050 may determine whether an obstruction 716c is detected in the zone portion 708 and provide this information 722 to the control subsystem 900. In other cases, the AV 1002 may provide the information 722 as data from the vehicle sensor subsystem 1044 of the AV 1002. In such cases, the control subsystem 900 may use the obstruction detection instructions 916c to determine if an obstruction 716c is detected in the zone portion 708, as described above with respect to the detection of obstructions 716a,b and with respect to FIGS. 3-6.

In an example operation of the mobile AV re-launching system 700, the AV 1002 comes to a stop at the side of the road 726 for maintenance (e.g., to repair or replace a flat tire or the like). A service technician (e.g., user 704) arrives at the location of the stopped AV 1002 and performs the needed maintenance. Following completion of the maintenance, the AV 1002 may be ready to return to the road 726 and continue moving along the route 100. However, the AV 1002 alone may not be capable of ensuring that there are no obstructions along the sides and rear of the AV 1002. For instance, the vehicle sensor subsystem 1044 may not provide a view that encompasses the portion 706 of the space around the AV 1002 where the example obstruction 716a is located near the side of the trailer of the AV 1002 and the obstruction 716b is under the trailer attached to the AV 1002. In order to ensure that the AV 1002 returns safely to the road 726, the service technician (user 704) may operate the portable device 702 to aid in re-launching the stopped AV 1002 along its route 100.

In some cases, the service technician (user 704) may visibly inspect at least the portion 706 of the zone around the stopped AV 1002 to determine whether the AV 1002 is free of obstructions 716a,b that would prevent safe movement of the AV 1002. If the service technician (user 704) determines that at least the portion 706 of the zone around the AV 1002 is free of obstructions 716a,b, then the service technician (user 704) may operate the device 702 to provide a confirmation that the zone portion 706 is free of obstructions 716a,b to the control subsystem 900. Upon receiving the confirmation 718, the control subsystem 900 uses information 722 provided by the AV 1002 to determine if the portion 708 of the zone around the stopped AV 1002 is also free of obstructions 714c. If both of the zones 706, 708 are free of obstructions 716a-c, then the control subsystem 900 provides permission 724 for the AV 1002 to begin moving to the road 726. Otherwise, if either of zones 706 and 708 is not free of obstructions 716a-c, then permission 724 is not provided.

In other cases, rather than using the confirmation 718 alone, the service technician (user 704) may also or alternatively capture images and/or video 720 of the zone portion 706 using portable device 702. These images and/or video 720 may be provided to the control subsystem 900 in order to determine if the portion 706 of the zone around the stopped AV 1002 is free of obstructions 716a,b. For instance, in an example case where images 720 are provided to the control subsystem 900, the service technician (user 704) may move about the AV 1002 and capture images 720 of the AV 1002 and areas around the AV 1002 from different perspectives (e.g., at different positions 710a-f illustrated in FIG. 7A). In some embodiments, the service technician (user 704) may use the device 702 to capture images 720 that include the markers 714a-f such that images 720 include representations of obstructions 716a,b that may be present in the fields-of-view 712a-f. As another example, in a case where video 720 is provided to the control subsystem 900, the service technician (user 704) may move about the AV 1002 to capture video 720 of the AV 1002 and areas around the AV 1002 from different perspectives (e.g., a video 720 captured as the service technician moves between the different positions 710a-f illustrated in FIG. 7A). The control subsystem 900 uses the obstruction detection instructions 916c to detect any obstructions 716a,b appearing in the images and/or videos 720.

Following a determination that no obstruction 716a,b is detected in the images and/or videos 720, the control subsystem 900 uses information 722 provided by the AV 1002 to determine if the portion 708 of the zone around the stopped AV 1002 is also free of obstructions 714c, as described above. If both of the zones 706, 708 are free of obstructions 716a-c, then the portable device 702 provides permission 724 for the AV 1002 to begin moving to the road 726. Otherwise, if either of zones 706 and 708 is not free of all obstructions 716a-c, then permission 724 is not provided.

FIG. 7B shows an embodiment of a portable device 702 of FIGS. 1 and 7A. The portable device 702 includes a processor 752, a memory 754, a network interface 756, and a camera 758. The portable device 702 may be configured as shown or in any other suitable configuration.

The processor 752 includes one or more processors operably coupled to the memory 754. The processor 752 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 752 may be a programmable logic device, a microcontroller, a microprocessor, or any suitable combination of the preceding. The processor 752 is communicatively coupled to and in signal communication with the memory 754 and the network interface 756. The one or more processors are configured to process data and may be implemented in hardware or software. For example, the processor 752 may be 8-bit, 16-bit, 32-bit, 64-bit or of any other suitable architecture. The processor 752 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 7A and 8. In some embodiments, the function described herein is implemented using logic units, FPGAs, ASICs, DSPs, or any other suitable hardware or electronic circuitry.

The memory 754 is operable to store any of the information described above with respect to FIG. 7A along with any other data, instructions, logic, rules, or code operable to implement the function(s) described herein when executed by processor 752. The memory 754 includes one or more disks, tape drives, or solid-state drives, and may be used as an over-flow data storage device, to store programs when such programs are selected for execution, and to store instructions and data that are read during program execution. The memory 754 may be volatile or non-volatile and may comprise read-only memory (ROM), random-access memory (RAM), ternary content-addressable memory (TCAM), dynamic random-access memory (DRAM), and static random-access memory (SRAM).

The network interface 756 is configured to enable wired and/or wireless communications. The network interface 756 is configured to communicate data between the portable device 702 and other network devices, systems, or domain(s). For example, the network interface 756 may comprise a WIFI interface, a local area network (LAN) interface, a wide area network (WAN) interface, a modem, a switch, or a router. The processor 752 is configured to send and receive data using the network interface 756. The network interface 756 may be configured to use any suitable type of communication protocol.

The camera 758 is configured to obtain an image and/or video 758. Generally, the camera 758 may be any type of camera. For example, the camera 758 may include one or more sensors, an aperture, one or more lenses, and a shutter. The camera 758 is in communication with the processor 752, which controls operations of the camera 758 (e.g., opening/closing of the shutter, etc.). Data from the sensor(s) of the camera 758 may be provided to the processor 752 and stored in the memory 754 in an appropriate image or video format for use by control subsystem 900.

FIG. 8 illustrates an example method 800 of operating the mobile AV re-launching system 700 of FIG. 7A. The method 800 may be implemented by the portable device 702, control subsystem 900, and/or AV 1002. The method 800 may begin at step 802 where the control subsystem 900 receives a request to re-launch the AV 1002. For example, a user 704 (e.g., a service technician, as described with respect to the example of FIG. 7A above) may provide an indication that maintenance and any appropriate testing of the stopped AV 1002 is complete.

At step 804, the control subsystem 900 receives confirmation 718 that the zone portion 706 is free of obstructions and/or receives images and/or video 720 of the zone portion 706, as described above with respect to FIG. 7A. In some embodiments, receipt of the confirmation 718 and/or the images and/or video 720 acts as a request to permit re-launch of the AV 1002 (i.e., such that a separate request is not received at step 802).

At step 806, the control subsystem 900 receives information 722 from the AV 1002. The information 122 may include a confirmation that the in-vehicle computer 1050 has not detected an obstruction 716c in the zone portion 708 and/or sensor data from the vehicle sensor subsystem 1044.

At step 808, the control subsystem 900 determines if the zone around the AV 1002 is free of obstructions 716a-c preventing safe movement of the AV 1002. For example, as described above with respect to FIG. 7A, if it is determined that both zone portion 706 and zone portion 708 around the stopped AV 1002 are free of obstructions 716a-c, the control subsystem 900 determines that the zone around the AV 1002 is clear for movement of the AV 1002. Otherwise, if the control subsystem 900 determines that at least one of the zone portions 706 or 708 around the stopped AV 1002 is not free of obstructions 716a-c, the control subsystem 900 determines that the zone around the AV 1002 is not clear for movement of the AV 1002.

If the zones 706, 708 around the stopped AV 1002 are determined to be clear for safe movement of the stopped AV 1002, the control subsystem 900 proceeds to step 810 where the control subsystem 900 provides permission 724 for the AV 1002 to begin moving. Otherwise, if the zones 706, 708 around the stopped AV 1002 are determined to not be clear for safe movement of the stopped AV 1002, the control subsystem 900 may prevent the stopped AV 1002 from beginning to move. The control subsystem 900 may further proceed to step 812 to determine if the stopped AV 1002 has been prevented from moving for at least a threshold time. If this is the case, the control subsystem 900 may provide an alert at step 814 for further action to be taken to clear the zone around the AV 1002 (e.g., by removing one or more of the obstructions 716a-c or requesting other action from the user 704).

Example Control Subsystem 900

FIG. 9 shows an embodiment of the control subsystem 900 illustrated in FIGS. 2, 3, 5, and 7A. The control subsystem 900 includes at least one processor 902, at least one memory 904, and at least one network interface 906. The control subsystem 900 may be configured as shown or in any other suitable configuration.

The processor 902 comprises one or more processors operably coupled to the memory 904. The processor 902 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 902 may be a programmable logic device, a microcontroller, a microprocessor, or any suitable combination of the preceding. The processor 902 is communicatively coupled to and in signal communication with the memory 904 and the network interface 906. The one or more processors are configured to process data and may be implemented in hardware or software. For example, the processor 902 may be 8-bit, 16-bit, 32-bit, 64-bit or of any other suitable architecture. The processor 902 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-8. In some embodiments, the function described herein is implemented using logic units, FPGAs, ASICs, DSPs, or any other suitable hardware or electronic circuitry.

The memory 904 is operable to store any of the information described above with respect to FIGS. 1-8 along with any other data, instructions, logic, rules, or code operable to implement the function(s) described herein when executed by processor 902. For example, the memory 904 may store the data 908 from received from AVs 1002 (e.g., data from AV signals 220 and/or information 722), data 910 from the launchpads 300 (e.g., launchpad signals 218), data 912 from the landing pads 500 (e.g., landing pad signals 226), and data 914 from the portable re-launching device 712 (e.g., confirmation 718 and/or images and/or videos 710). The memory 904 may further store the obstruction detection instructions 916*a*-*c* described above with respect to FIGS. 3-8. The memory 904 comprises one or more disks, tape drives, or solid-state drives, and may be used as an over-flow data storage device, to store programs when such programs are selected for execution, and to store instructions and data that are read during program execution. The memory 904 may be volatile or non-volatile and may comprise read-only memory (ROM), random-access memory (RAM), ternary content-addressable memory (TCAM), dynamic random-access memory (DRAM), and static random-access memory (SRAM).

The network interface 906 is configured to enable wired and/or wireless communications. The network interface 906 is configured to communicate data between the control subsystem 900 and other network devices, systems, or domain(s). For example, the network interface 906 may comprise a WIFI interface, a local area network (LAN) interface, a wide area network (WAN) interface, a modem, a switch, or a router. The processor 902 is configured to send and receive data using the network interface 906. The network interface 906 may be configured to use any suitable type of communication protocol.

Example AV 1002 and its Operation

FIG. 10 shows a block diagram of an example vehicle ecosystem 1000 in which autonomous driving operations can be determined. As shown in FIG. 10, the AV 1002 may be a semi-trailer truck. The vehicle ecosystem 1000 includes several systems and components that can generate and/or deliver one or more sources of information/data and related services to the in-vehicle control computer 1050 that may be located in an AV 1002. The in-vehicle control computer 1050 can be in data communication with a plurality of vehicle subsystems 1040, all of which can be resident in the AV 1002. A vehicle subsystem interface 1060 is provided to facilitate data communication between the in-vehicle control computer 1002 and the plurality of vehicle subsystems 1040. In some embodiments, the vehicle subsystem interface 1060 can include a controller area network (CAN) controller to communicate with devices in the vehicle subsystems 1040.

The AV 1002 may include various vehicle subsystems that support of the operation of AV 1002. The vehicle subsystems may include a vehicle drive subsystem 1042, a vehicle sensor subsystem 1044, and/or a vehicle control subsystem 1046. The components or devices of the vehicle drive subsystem 1042, the vehicle sensor subsystem 1044, and the vehicle control subsystem 1046 shown in FIG. 10 are examples. The vehicle drive subsystem 1042 may include components operable to provide powered motion for the AV 1002. In an example embodiment, the vehicle drive subsystem 1042 may include an engine or motor 1042*a*, wheels/tires 1042*b*, a transmission 1042*c*, an electrical subsystem 1042*d*, and a power source 1042*e*.

The vehicle sensor subsystem 1044 may include a number of sensors configured to sense information about an environment or condition of the AV 1002. The vehicle sensor subsystem 1044 may include one or more cameras 1044*a* or image capture devices, a RADAR unit 1044*b*, one or more temperature sensors 1044*c*, a wireless communication unit 1044*d* (e.g., a cellular communication transceiver), an inertial measurement unit (IMU) 1044*e*, a laser range finder/LIDAR unit 1044*f*, a Global Positioning System (GPS) transceiver 1044*g*, and/or a wiper control system 1044*h*. The vehicle sensor subsystem 1044 may also include sensors configured to monitor internal systems of the AV 1002 (e.g., an $O_2$ monitor, a fuel gauge, an engine oil temperature, etc.).

The IMU 1044*e* may include any combination of sensors (e.g., accelerometers and gyroscopes) configured to sense position and orientation changes of the AV 1002 based on inertial acceleration. The GPS transceiver 1044*q* may be any sensor configured to estimate a geographic location of the AV 1002. For this purpose, the GPS transceiver 1044*q* may include a receiver/transmitter operable to provide information regarding the position of the AV 1002 with respect to the Earth. The RADAR unit 1044*b* may represent a system that utilizes radio signals to sense objects within the local environment of the AV 1002. In some embodiments, in addition to sensing the objects, the RADAR unit 1044*b* may additionally be configured to sense the speed and the heading of the objects proximate to the AV 1002. The laser range finder or LIDAR unit 1044*f* may be any sensor configured to sense objects in the environment in which the AV 1002 is located using lasers. The cameras 1044*a* may include one or more devices configured to capture a plurality of images of the environment of the AV 1002. The cameras 1044*a* may be still image cameras or motion video cameras.

The vehicle control subsystem 1046 may be configured to control operation of the AV 1002 and its components. Accordingly, the vehicle control subsystem 1046 may include various elements such as a throttle and gear 1046a, a brake unit 1046b, a navigation unit 1046c, a steering system 1046d, and/or an autonomous control unit 1046e. The throttle 1046a may be configured to control, for instance, the operating speed of the engine and, in turn, control the speed of the AV 1002. The gear 1046a may be configured to control the gear selection of the transmission. The brake unit 1046b can include any combination of mechanisms configured to decelerate the AV 1002. The brake unit 1046b can use friction to slow the wheels in a standard manner. The brake unit 1046b may include an Anti-lock brake system (ABS) that can prevent the brakes from locking up when the brakes are applied. The navigation unit 1046c may be any system configured to determine a driving path or route for the AV 1002. The navigation 1046c unit may additionally be configured to update the driving path dynamically while the AV 1002 is in operation. In some embodiments, the navigation unit 1046c may be configured to incorporate data from the GPS transceiver 1044q and one or more predetermined maps so as to determine the driving path (e.g., along the route 100 of FIG. 1) for the AV 1002. The steering system 1046d may represent any combination of mechanisms that may be operable to adjust the heading of AV 1002 in an autonomous mode or in a driver-controlled mode.

The autonomous control unit 1046e may represent a control system configured to identify, evaluate, and avoid or otherwise negotiate potential obstacles or obstructions in the environment of the AV 1002. In general, the autonomous control unit 1046e may be configured to control the AV 1002 for operation without a driver or to provide driver assistance in controlling the AV 1002. In some embodiments, the autonomous control unit 1046e may be configured to incorporate data from the GPS transceiver 1044q, the RADAR 1044b, the LIDAR unit 1044f, the cameras 1044a, and/or other vehicle subsystems to determine the driving path or trajectory for the AV 1002.

Many or all of the functions of the AV 1002 can be controlled by the in-vehicle control computer 1050. The in-vehicle control computer 1050 may include at least one data processor 1070 (which can include at least one microprocessor) that executes processing instructions 1080 stored in a non-transitory computer readable medium, such as the data storage device 1090 or memory. The in-vehicle control computer 1050 may also represent a plurality of computing devices that may serve to control individual components or subsystems of the AV 1002 in a distributed fashion. In some embodiments, the data storage device 1090 may contain processing instructions 1080 (e.g., program logic) executable by the data processor 1070 to perform various methods and/or functions of the AV 1002, including those described with respect to FIGS. 1-9 above and FIGS. 11 and 12 below.

The data storage device 1090 may contain additional instructions as well, including instructions to transmit data to, receive data from, interact with, or control one or more of the vehicle drive subsystem 1042, the vehicle sensor subsystem 1044, and the vehicle control subsystem 1046. The in-vehicle control computer 1050 can be configured to include a data processor 1070 and a data storage device 1090. The in-vehicle control computer 1050 may control the function of the AV 1002 based on inputs received from various vehicle subsystems (e.g., the vehicle drive subsystem 1042, the vehicle sensor subsystem 1044, and the vehicle control subsystem 1046).

FIG. 11 shows an exemplary system 1100 for providing precise autonomous driving operations. The system 1100 includes several modules that can operate in the in-vehicle control computer 1050, as described in FIG. 10. The in-vehicle control computer 1050 includes a sensor fusion module 1102 shown in the top left corner of FIG. 11, where the sensor fusion module 1102 may perform at least four image or signal processing operations. The sensor fusion module 1102 can obtain images from cameras located on an autonomous vehicle to perform image segmentation 1104 to detect the presence of moving objects (e.g., other vehicles, pedestrians, etc.,) and/or static obstacles (e.g., stop sign, speed bump, terrain, etc.,) located around the autonomous vehicle. The sensor fusion module 1102 can obtain LiDAR point cloud data item from LiDAR sensors located on the autonomous vehicle to perform LiDAR segmentation 1106 to detect the presence of objects and/or obstacles located around the autonomous vehicle.

The sensor fusion module 1102 can perform instance segmentation 1108 on image and/or point cloud data item to identify an outline (e.g., boxes) around the objects and/or obstacles located around the autonomous vehicle. The sensor fusion module 1102 can perform temporal fusion where objects and/or obstacles from one image and/or one frame of point cloud data item are correlated with or associated with objects and/or obstacles from one or more images or frames subsequently received in time.

The sensor fusion module 1102 can fuse the objects and/or obstacles from the images obtained from the camera and/or point cloud data item obtained from the LiDAR sensors. For example, the sensor fusion module 1102 may determine based on a location of two cameras that an image from one of the cameras comprising one half of a vehicle located in front of the autonomous vehicle is the same as the vehicle located captured by another camera. The sensor fusion module 1102 sends the fused object information to the inference module 1146 and the fused obstacle information to the occupancy grid module 1160. The in-vehicle control computer includes the occupancy grid module 1160 can retrieve landmarks from a map database 1158 stored in the in-vehicle control computer. The occupancy grid module 1160 can determine drivable area and/or obstacles from the fused obstacles obtained from the sensor fusion module 1102 and the landmarks stored in the map database 1158. For example, the occupancy grid module 1160 can determine that a drivable area may include a speed bump obstacle.

Below the sensor fusion module 1102, the in-vehicle control computer 1050 includes a LiDAR based object detection module 1112 that can perform object detection 1116 based on point cloud data item obtained from the LiDAR sensors 1114 located on the autonomous vehicle. The object detection 1116 technique can provide a location (e.g., in 3D world coordinates) of objects from the point cloud data item. Below the LiDAR based object detection module 1112, the in-vehicle control computer includes an image based object detection module 1118 that can perform object detection 1124 based on images obtained from cameras 1120 located on the autonomous vehicle. The object detection 1124 technique can employ a deep machine learning technique to provide a location (e.g., in 3D world coordinates) of objects from the image provided by the camera.

The RADAR on the autonomous vehicle can scan an area in front of the autonomous vehicle or an area towards which the autonomous vehicle is driven. The Radar data is sent to the sensor fusion module 1102 that can use the Radar data to correlate the objects and/or obstacles detected by the RADAR with the objects and/or obstacles detected from both the LiDAR point cloud data item and the camera image. The Radar data is also sent to the inference module 1146 that can perform data processing on the radar data to track objects 1148 as further described below.

The in-vehicle control computer includes an inference module 1146 that receives the locations of the objects from the point cloud and the objects from the image, and the fused objects from the sensor fusion module 1102. The inference module 1146 also receive the Radar data with which the inference module 1146 can track objects 1148 from one point cloud data item and one image obtained at one time instance to another (or the next) point cloud data item and another image obtained at another subsequent time instance.

The inference module 1146 may perform object attribute estimation 1150 to estimate one or more attributes of an object detected in an image or point cloud data item. The one or more attributes of the object may include a type of object (e.g., pedestrian, car, or truck, etc.). The inference module 1148 may perform behavior prediction 1148 to estimate or predict motion pattern of an object detected in an image and/or a point cloud. The behavior prediction 1148 can be performed to detect a location of an object in a set of images received at different points in time (e.g., sequential images) or in a set of point cloud data item received at different points in time (e.g., sequential point cloud data items). In some embodiments the behavior prediction 1148 can be performed for each image received from a camera and/or each point cloud data item received from the LiDAR sensor. In some embodiments, the inference module 1146 can be performed to reduce computational load by performing behavior prediction 1148 on every other or after every pre-determined number of images received from a camera or point cloud data item received from the LiDAR sensor (e.g., after every two images or after every three point cloud data items).

The behavior prediction 1152 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the inference module 1146 may assign motion pattern situational tags to the objects (e.g., "located at coordinates (x,y)," "stopped," "driving at 50 mph," "speeding up" or "slowing down"). The situation tags can describe the motion pattern of the object. The inference module 1146 sends the one or more object attributes (e.g., types of the objects) and motion pattern situational tags to the planning module 1162.

The in-vehicle control computer includes the planning module 1162 that receives the object attributes and motion pattern situational tags from the inference module 1146, the drivable area and/or obstacles, and the vehicle location and pose information from the fused localization module 1126 (further described below).

The planning module 1162 can perform navigation planning 1164 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 1164 may include determining an area next to the road where the autonomous vehicle can be safely parked in case of emergencies. The planning module 1162 may include behavioral decision making 1166 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 1162 performs trajectory generation 1168 and selects a trajectory from the set of trajectories determined by the navigation planning operation 1164. The selected trajectory information is sent by the planning module 1162 to the control module 1170.

The in-vehicle control computer includes a control module 1170 that receives the proposed trajectory from the planning module 1162 and the autonomous vehicle location and pose from the fused localization module 1126. The control module 1170 includes a system identifier 1172. The control module 1170 can perform a model based trajectory refinement 1170 to refine the proposed trajectory. For example, the control module 1170 can applying a filtering (e.g., Kalman filter) to make the proposed trajectory data smooth and/or to minimize noise. The control module 1170 may perform the robust control 1176 by determining, based on the refined proposed trajectory information and current location and/or pose of the autonomous vehicle, an amount of brake pressure to apply, a steering angle, a throttle amount to control the speed of the vehicle, and/or a transmission gear. The control module 1170 can send the determined brake pressure, steering angle, throttle amount, and/or transmission gear to one or more devices in the autonomous vehicle to control and facilitate precise driving operations of the autonomous vehicle.

The deep image-based object detection 1124 performed by the image based object detection module 1118 can also be used detect landmarks (e.g., stop signs, speed bumps, etc.,) on the road. The in-vehicle control computer includes a fused localization module 1126 that obtains landmarks detected from images, the landmarks obtained from a map database 1136 stored on the in-vehicle control computer, the landmarks detected from the point cloud data item by the LiDAR based object detection module 1112, the speed and displacement from the odometer sensor 1144 and the estimated location of the autonomous vehicle from the GPS/IMU sensor 1138 located on or in the autonomous vehicle. Based on this information, the fused localization module 1126 can perform a localization operation 1128 to determine a location of the autonomous vehicle, which can be sent to the planning module 1162 and the control module 1170.

The fused localization module 1126 can estimate pose 1130 of the autonomous vehicle based on the GPS and/or IMU sensors. The pose of the autonomous vehicle can be sent to the planning module 1162 and the control module 1170. The fused localization module 1126 can also estimate status (e.g., location, possible angle of movement) of the trailer unit based on, for example, the information provided by the IMU sensor (e.g., angular rate and/or linear velocity). The fused localization module 1126 may also check the map content 1132.

FIG. 12 shows an exemplary block diagram of an in-vehicle control computer 1050 included in an autonomous AV 1002. The in-vehicle control computer 1050 includes at least one processor 1204 and a memory 1202 having instructions stored thereupon. The instructions upon execution by the processor 1204 configure the in-vehicle control computer 1050 and/or the various modules of the in-vehicle control computer 1050 to perform the operations described in FIGS. 10 and 11. The transmitter 1206 transmits or sends information or data to one or more devices in the autonomous vehicle. For example, a transmitter 1206 can send an instruction to one or more motors of the steering wheel to steer the autonomous vehicle. The receiver 1208 receives information or data transmitted or sent by one or more devices. For example, the receiver 1208 receives a status of the current speed from the odometer sensor or the current transmission gear from the transmission. The transmitter 1206 and receiver 1208 are also configured to communicate with the control subsystem 900 described above with respect to FIGS. 1-9.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
    a control subsystem, external to an autonomous vehicle, comprising a processor configured to:
        receive landing pad sensor data from one or more landing pad sensors, wherein the one or more landing pad sensors is located in or around each landing pad of a plurality of landing pads, each landing pad sensor is configured to observe at least a portion of the landing pad;
        receive, from the autonomous vehicle traveling to a terminal, a request for an assigned landing pad of the plurality of landing pads in which the autonomous vehicle should be positioned;
        in response to receiving the request for the assigned landing pad:
            determine, based at least in part upon the received landing pad sensor data, that a first landing pad is free of obstructions that would prevent receipt of the autonomous vehicle;
            in response to determining that the first landing pad is free of obstructions that would prevent receipt of the first autonomous vehicle, provide an indication to the autonomous vehicle that the first landing pad is the assigned landing pad, wherein the indication is configured to cause the autonomous vehicle to, in response to the indication, maneuver onto the assigned landing pad.

2. The system of claim 1, further comprising an in-vehicle control computer associated with the first autonomous vehicle, communicatively coupled to the control subsystem, and comprising a second processor configured to:
    receive the indication from the control subsystem.

3. The system of claim 2, the processor further configured to:
    receive an indication from the autonomous vehicle that a first obstruction is detected in a determined inbound lane;
    in response to receiving the indication, determine an alternate inbound lane; and
    provide an indication of the alternate inbound lane to the autonomous vehicle.

4. The system of claim 3, the processor further configured to:
    determine that the alternate inbound lane does not lead to the assigned landing pad; and
    in response to determining that the alternate inbound lane does not lead to the assigned landing pad:
        determine a new assigned landing pad for the autonomous vehicle; and
        provide an indication of the new assigned landing pad to the autonomous vehicle.

5. The system of claim 1, the processor further configured to:
    detect a first obstruction in a portion of the first landing pad for at least a threshold period of time;
    in response to detecting the first obstruction in the portion of the first landing pad, provide instructions to inspect the portion of the first landing pad;
    if an indication is received indicating that the portion of the first landing pad has become free of the first obstruction:
        provide the indication that the first landing pad is confirmed as the assigned landing pad to the autonomous vehicle; and
        flag a first landing pad sensor associated with detecting the first obstruction, the flag indicating maintenance is needed for the first landing pad sensor; and
    if an indication is received indicating that the portion of the first landing pad is not free of the first obstruction, determine whether a second landing pad is free of obstructions that would prevent receipt of the autonomous vehicle.

6. The system of claim 1, the processor further configured to:
    determine that no obstruction is detected by any of the one or more landing pad sensors associated with the first landing pad for at least a predefined period of time; and
    in response to determining that no obstruction is detected by any of the one or more landing pad sensors associated with the first landing pad for at least the predefined period of time, determine that the first landing pad is free of obstructions that would prevent receipt of the autonomous vehicle based on a determination.

7. The system of claim 1, wherein the autonomous vehicle is a tractor unit and each of the plurality of landing pads defines a zone that is sized and shaped to fit both the tractor unit and a trailer attached to the tractor unit.

8. The system of claim 1, wherein the first landing pad sensors comprise one or more of cameras, LiDAR sensors, motion sensors, and infrared sensors.

9. The system of claim 1, wherein:
    the landing pad sensor data includes images of the first landing pad; and the processor is further configured to determine whether the first landing pad is free of obstructions that would prevent receipt of the autonomous vehicle by:
  detecting an object in the images of the landing pad;
  determining whether the detected object is an obstruction that would prevent receipt of the autonomous vehicle;
  if the detected object is not determined to be the obstruction, determining that the first landing pad is free of obstructions that would prevent receipt of the autonomous vehicle; and
  if the detected object is determined to be the obstruction, determining that the first landing pad is not free of obstructions that would prevent receipt of the autonomous vehicle.

10. A method, comprising:
receiving, by a control subsystem external to an autonomous vehicle, landing pad sensor data from one or more landing pad sensors located in or around each landing pad of a plurality of landing pads;
receiving, by the control subsystem from the autonomous vehicle traveling to a terminal, a request for an assigned landing pad of the plurality of landing pads in which the autonomous vehicle should be positioned;
in response to receiving the request for the assigned landing pad:
  determining, by the control subsystem based at least in part upon the received landing pad sensor data, that a first landing pad is free of obstructions that would prevent receipt of the autonomous vehicle;
  in response to determining that the first landing pad is free of obstructions that would prevent receipt of the autonomous vehicle, providing, by the control subsystem, an indication to the autonomous vehicle that the first landing pad is the assigned landing pad;
  wherein the indication is configured to cause the autonomous vehicle to, in response to the indication, maneuver onto the assigned landing pad.

11. The method of claim 10, further comprising:
receiving, by an in-vehicle control computer associated with the autonomous vehicle, the indication from the control subsystem.

12. The method of claim 10, further comprising:
determining an inbound lane for the autonomous vehicle to traverse to reach the assigned landing pad from a road on which the autonomous vehicle is traveling; and
providing an indication of the determined inbound lane to the autonomous vehicle.

13. The method of claim 12, further comprising:
receiving an indication from the autonomous vehicle that a first obstruction is detected in the determined inbound lane;
in response to receiving the indication, determining an alternate inbound lane; and
provide an indication of the alternate inbound lane to the autonomous vehicle.

14. The method of claim 13, further comprising:
determining that the alternate inbound lane does not lead to the assigned landing pad; and
in response to determining that the alternate inbound lane does not lead to the assigned landing pad:
  determining a new assigned landing pad for the autonomous vehicle; and
  providing an indication of the new assigned landing pad to the autonomous vehicle.

15. The method of claim 10, further comprising:
detecting a first obstruction in a portion of the first landing pad for at least a threshold period of time;
in response to detecting the first obstruction in the portion of the first landing pad, providing instructions to inspect the portion of the first landing pad;
if an indication is received indicating that the portion of the first landing pad has become free of the first obstruction:
  providing the indication that the first landing pad is confirmed as the assigned landing pad to the autonomous vehicle; and
  flagging a first landing pad sensor associated with detecting the first obstruction, the flag indicating maintenance is needed for the first landing pad sensor; and
if an indication is received indicating that the portion of the first landing pad is not free of the first obstruction, determining whether a second landing pad is free of obstructions that would prevent receipt of the autonomous vehicle.

16. The method of claim 10, further comprising:
determining that no obstruction is detected by any of the one or more landing pad sensors associated with the first landing pad for at least a predefined period of time; and
in response to determining that no obstruction is detected by any of the one or more landing pad sensors associated with the first landing pad for at least the predefined period of time, determining that the first landing pad is free of obstructions that would prevent receipt of the autonomous vehicle based on a determination.

17. The method of claim 10, wherein:
the landing pad sensor data includes images of the first landing pad; and
the method further comprises determining whether the first landing pad is free of obstructions that would prevent receipt of the autonomous vehicle by:
  detecting an object in the images of the first landing pad;
  determining whether the detected object is an obstruction that would prevent receipt of the autonomous vehicle;
  if the detected object is not determined to be the obstruction, determining that the first landing pad is free of obstructions that would prevent receipt of the autonomous vehicle; and
  if the detected object is determined to be the obstruction, determining that the first landing pad is not free of obstructions that would prevent receipt of the autonomous vehicle.

18. A control subsystem external to an autonomous vehicle, comprising:
a network interface configured to communicate with:
  one or more landing pad sensors located in or around each of a plurality of landing pads, wherein each landing pad sensor is configured to observe at least a portion of a corresponding landing pad, and
  at least one vehicle sensor associated with the autonomous vehicle; and
a processor communicatively coupled to the network interface and configured to:
  receive landing pad sensor data from the one or more landing pad sensors;
  receive, from the autonomous vehicle traveling to a terminal, a request for an assigned landing pad of the plurality of landing pads in which the autonomous vehicle should be positioned;

in response to receiving the request for the assigned landing pad:
- determine, based at least in part upon the received landing pad sensor data, that a first landing pad is free of obstructions that would prevent receipt of the autonomous vehicle;
- in response to determining that the first landing pad is free of obstructions that would prevent receipt of the autonomous vehicle, provide an indication to the autonomous vehicle that the first landing pad is the assigned landing pad, such that in response to receiving the indication, the autonomous vehicle is maneuvered onto the assigned landing pad.

19. The control subsystem of claim 18, the processor further configured to, subsequent to determining that the first landing pad is free of obstructions that would prevent receipt of the autonomous vehicle:
- detect, based on the received landing pad sensor data, that the first landing pad is no longer free of obstructions;
- in response to detecting that the first landing pad is no longer free of obstructions:
  - determine, based on the received landing pad sensor data, that a second landing pad is free of obstructions that would prevent receipt of the autonomous vehicle; and
  - in response to determining that the second landing pad is free of obstructions that would prevent receipt of the autonomous vehicle, provide an indication that the second landing pad is the assigned landing pad.

* * * * *